United States Patent
Nagamine

(10) Patent No.: US 8,655,165 B2
(45) Date of Patent: Feb. 18, 2014

(54) LIGHT TRANSMISSION DEVICE, OPTICAL RELAY DEVICE, OPTICAL WAVELENGTH MULTIPLEXING TRANSMISSION APPARATUS, AND LIGHT TRANSMISSION METHOD

(75) Inventor: Kazuaki Nagamine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 56 days.

(21) Appl. No.: 12/929,845

(22) Filed: Feb. 18, 2011

(65) Prior Publication Data

US 2011/0236016 A1    Sep. 29, 2011

(30) Foreign Application Priority Data

Mar. 23, 2010   (JP) .................................. 2010-067029

(51) Int. Cl.
*H04B 10/00* (2013.01)
*H04J 14/02* (2006.01)

(52) U.S. Cl.
USPC ........ 398/6; 398/19; 398/45; 398/48; 398/79; 398/177; 398/182

(58) Field of Classification Search
USPC ...................................................... 398/6, 18
See application file for complete search history.

(56) References Cited

U.S. PATENT DOCUMENTS

| 5,200,949 | A  | * | 4/1993  | Kobayashi .................... 370/228 |
| 5,757,526 | A  |   | 5/1998  | Shiragaki et al. |
| 6,292,602 | B1 | * | 9/2001  | Suzuki ............................. 385/24 |
| 6,320,684 | B2 |   | 11/2001 | Uehara |
| 7,113,698 | B1 | * | 9/2006  | Ryhorchuk et al. ............ 398/10 |
| 2006/0210266 | A1 | * | 9/2006 | Aoki ................................ 398/19 |
| 2007/0223917 | A1 | * | 9/2007 | Nagamine ......................... 398/1 |

FOREIGN PATENT DOCUMENTS

| JP | 5-244098  | 9/1993  |
| JP | 6-37717   | 2/1994  |
| JP | 9-163413  | 6/1997  |
| JP | 9-247196  | 9/1997  |
| JP | 10-303863 | 11/1998 |
| JP | 11-243374 | 9/1999  |

OTHER PUBLICATIONS

Japanese Office Action for corresponding Japanese Patent Application No. 2012-067029, mailed Dec. 17, 2013, 8 pages.

\* cited by examiner

*Primary Examiner* — Nathan Curs
*Assistant Examiner* — David Lambert
(74) *Attorney, Agent, or Firm* — Staas & Halsey LLP

(57) ABSTRACT

A relay station has an optical switch that switches a reception path of an optical signal. The relay station generates a subsignal that has a wavelength different from the wavelength of a data signal corresponding to a signal to be transmitted and transmits an optical signal obtained by multiplexing the generated subsignal and the data signal. In this state, when the data signal is not included in the received optical signal, the relay station determines whether the subsignal is included in the optical signal. When it is determined that the subsignal is included, the relay station maintains a connection path of the optical switch without switching the connection path.

8 Claims, 18 Drawing Sheets

FIG.8

| INPUT POWER LEVEL OF SUBSIGNAL | INPUT POWER LEVEL OF DATA SIGNAL | OPERATION CONTENTS |
|---|---|---|
| SIGNAL NON-EXISTENCE (0 dbm) | SIGNAL NON-EXISTENCE (0 dbm) | SETTING OF FAILURE DETECTION FLAG=ON AND SWITCHING PERMISSION FLAG=ON TO DOWNSTREAM SIDE |
| SIGNAL EXISTENCE (FAILURE DETECTION FLAG=ON) | SIGNAL NON-EXISTENCE (0 dbm) | TRANSMISSION OF FAILURE DETECTION FLAG AND SWITCHING PERMISSION FLAG FROM UPSTREAM SIDE TO DOWNSTREAM SIDE |
| SIGNAL EXISTENCE (FAILURE DETECTION FLAG=OFF) | SIGNAL NON-EXISTENCE (0 dbm) | TRANSMISSION OF FAILURE DETECTION FLAG AND SWITCHING PERMISSION FLAG FROM UPSTREAM SIDE TO DOWNSTREAM SIDE |
| SIGNAL NON-EXISTENCE (0 dbm) | SIGNAL EXISTENCE | MAINTAINING OF PREVIOUS VALUE OF FAILURE DETECTION FLAG AND SETTING OF SWITCHING PERMISSION FLAG=ON |
| SIGNAL EXISTENCE (FAILURE DETECTION FLAG=ON) | SIGNAL EXISTENCE | TRANSMISSION OF FAILURE DETECTION FLAG AND SWITCHING PERMISSION FLAG FROM UPSTREAM SIDE TO DOWNSTREAM SIDE |
| SIGNAL EXISTENCE (FAILURE DETECTION FLAG=OFF) | SIGNAL EXISTENCE | TRANSMISSION OF FAILURE DETECTION FLAG AND SWITCHING PERMISSION FLAG FROM UPSTREAM SIDE TO DOWNSTREAM SIDE |

FIG.9

| INPUT POWER LEVEL OF SUBSIGNAL | INPUT POWER LEVEL OF DATA SIGNAL | OPERATION CONTENTS |
|---|---|---|
| SIGNAL NON-EXISTENCE (0 dbm) | SIGNAL NON-EXISTENCE (0 dbm) | SWITCHING DETERMINATION PROCESSING |
| SIGNAL EXISTENCE (FAILURE DETECTION FLAG=ON) | SIGNAL NON-EXISTENCE (0 dbm) | SWITCHING DETERMINATION PROCESSING |
| SIGNAL EXISTENCE (FAILURE DETECTION FLAG=OFF) | SIGNAL NON-EXISTENCE (0 dbm) | TRANSMISSION OF FAILURE DETECTION FLAG AND SWITCHING PERMISSION FLAG FROM UPSTREAM SIDE TO DOWNSTREAM SIDE |
| SIGNAL NON-EXISTENCE (0 dbm) | SIGNAL EXISTENCE | MAINTAINING OF PREVIOUS VALUE OF FAILURE DETECTION FLAG AND SETTING OF SWITCHING PERMISSION FLAG=ON |
| SIGNAL EXISTENCE (FAILURE DETECTION FLAG=ON) | SIGNAL EXISTENCE | SWITCHING DETERMINATION PROCESSING |
| SIGNAL EXISTENCE (FAILURE DETECTION FLAG=OFF) | SIGNAL EXISTENCE | TRANSMISSION OF FAILURE DETECTION FLAG AND SWITCHING PERMISSION FLAG FROM UPSTREAM SIDE TO DOWNSTREAM SIDE |

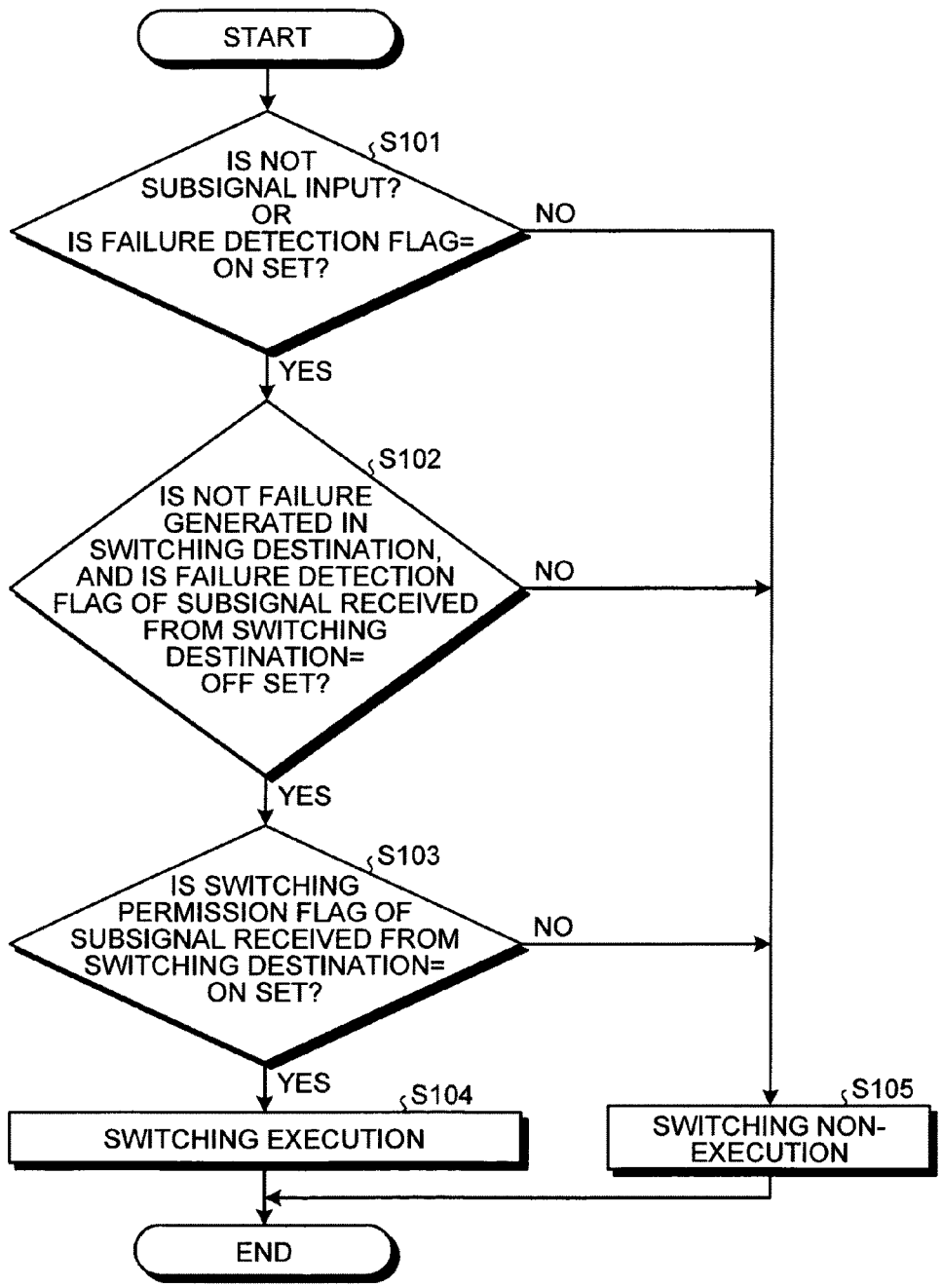

LIGHT TRANSMISSION DEVICE, OPTICAL RELAY DEVICE, OPTICAL WAVELENGTH MULTIPLEXING TRANSMISSION APPARATUS, AND LIGHT TRANSMISSION METHOD

CROSS-REFERENCE TO RELATED APPLICATION

This application is based upon and claims the benefit of priority of the prior Japanese Patent Application No. 2010-067029, filed on Mar. 23, 2010, the entire contents of which are incorporated herein by reference.

FIELD

The embodiments discussed herein are directed to a light transmission device, an optical relay device, an optical wavelength multiplexing transmission apparatus, an optical switch, and a light transmission method.

BACKGROUND

In the related art, when a mesh-type optical network is configured, a redundancy mechanism of a line or a path is employed to improve reliability of the network. In devices that include a terminal device such as Synchronous Optical NETwork (SONET) or Synchronous Digital Hierarchy (SDH), which performs a photoelectric conversion on a data signal, if the redundancy configuration of the photoelectric conversion is used, this may generally increase a cost and a signal delay. For this reason, in the devices, the redundancy configuration using the optical switch is preferable as long as optical characteristics allow.

Meanwhile, in the redundancy configuration based on the optical switch, interception of a signal according to a switching operation of the optical switch is also propagated to the downstream side and an optical switch of the downstream side is also switched interlocking with the switching of the optical switch. As a result, the fluttering phenomenon of unnecessary switching being frequently generated in plural optical switches is generated. As a method of suppressing the fluttering phenomenon from being generated, a used technique is to desensitize failure detection of the optical switch located at the downstream side using a switch control circuit having a timer function illustrated in FIG. 17 in the optical switch, that is, a technique of delaying light input break detection is used. As a result, switching timing of the optical switches that are connected in multi-steps is adjusted to prevent the fluttering phenomenon from being generated.

Next, an example of the case where the fluttering phenomenon is prevented by the optical switches having the timer function will be described using FIG. 18. FIG. 18 illustrates a first example of a network where the optical switches having the timer function are configured in multi-steps.

In the first example of the network configuration illustrated in FIG. 18, an A station (relay station), a B station (relay station), and a C station (terminal station) are provided and an optical signal is transmitted to each station through paths of two systems of a 0 system and a 1 system. The A station has an optical switch #1 and a coupler #1. The B station has an optical switch #2 where a hold-off time (delay time) of 50 msec is set and a coupler #2, and outputs an optical signal input from the A station to the C station. The C station has an optical switch #3 where a hold-off time (delay time) of 100 msec is set, and receives an optical signal input from the B station and terminates the optical paths of the two systems.

In this configuration, the optical switch #1 of the A station detects loss of light (LOL) of the 0 system path. In this case, transmission of the signal with respect to the downstream side (side of the B station) is stopped (shutdown) in both systems and the LOL is detected in both the B station and the C station. Then, the optical switch #1 of the A station switches a selector (SEL) from the 0 system to the 1 system, and the failure of the network is restored.

Meanwhile, the optical switch #2 of the B station collects a state of the 1 system with a polling period of the LOL and detects restoration of the LOL. At this time, the delay time of 50 msec is set to the optical switch #2 of the B station. Since the delay time of 50 msec does not pass from the detection of the LOL, SEL switching is not executed. Similar to the above case, the optical switch #3 of the C station collects a state of the 1 system with a polling period of the LOL and detects restoration of the LOL. At this time, in the optical switch #3 of the C station where the delay time of 100 msec is set, since the delay time of 100 msec does not pass from the detection of the LOL, SEL switching is not executed.

Then, after the delay time of 50 msec passes, the optical switch #2 of the B station detects that both the 0 system and the 1 system are normal and determines that switching of the SEL is not done. Likewise, after the delay time of 100 msec passes, the optical switch #3 of the C station detects that both the 0 system and the 1 system are normal and determines that the switching of the SEL is not done. That is, when the failure is detected in the A station of the upstream side, the optical switch of the A station immediately executes switching. Meanwhile, the optical switches of the B and C stations of the downstream side do not execute the switching, when restoration of the failure is detected before the delay time passes.

As described above, the timer that can set the delay time is provided in the optical switch of the downstream side, thereby monitoring an input of the optical signal for the delay time, instead of switching the optical switch whenever interception or supply of the optical signal is detected. After the delay time passes, when the optical signal is not input, the failure is restored by executing the switching by the optical switch and the fluttering phenomenon based on the switching of the plural optical switches is prevented from being generated.

However, in the related art, a long delay time to be set to the optical switch of the downstream side, and a long time is taken to restore the failure. Specifically, since switching timing of the optical switch becomes timing after the delay time passes, the optical switch of the downstream side where the long delay time is set is switched after a long time passes from the generation of the failure. That is, a long time is taken to restore a failure of the entire network.

For example, the case where the failure is generated in the B station in the network of FIG. 18 will be described. Specifically, it is assumed that the optical switch #2 of the B station detects the LOL in the 0 system. In this case, the optical switch #2 of the B station that is connected to the 0 system does not execute the switching of the SEL, because the delay time of 50 msec is set even though the LOL is detected in the 0 system and the 1 system is normal. That is, even though the optical switch #2 of the B station detects the LOL, the optical switch does not immediately execute the switching. For this reason, the optical switch #3 of the C station is affected by the failure of the B station and detects the LOL of both systems with the polling period of the LOL.

After the delay time of 50 msec passes from the generation of the failure, that is, the delay time of the optical switch #2 of the B station passes, the optical switch #2 detects that the LOL is detected in the 0 system and the 1 system is normal and switches the SEL from the 0 system to the 1 system.

Meanwhile, the optical switch #3 of the C station collects a state of the 1 system with the polling period of the LOL and detects that the LOL is restored. Since this point of time is a point of time before the delay time of 100 msec passes, the optical switch #3 of the C station does not execute the switching of the SEL. After the delay time of 100 msec passes, the optical switch #3 of the C station detects that both the 0 system and the 1 system are normal by the switching of the B station, and determines that the switching of the SEL is not done.

As such, when the failure is detected in the B station, quick switching of the SEL is not executed and the restoration is delayed by 50 msec as compared with the case where the failure is detected in the A station. Even when the LOL is detected by the optical switch #3 of the C station, the switching of the SEL is not executed until the delay time of 100 msec passes. For this reason, the restoration is delayed by 50 msec as compared with the example of the B station. Even in the case of a second example of the network illustrated in FIG. 19, in the optical switch of the C station where the delay time is set, even though a failure is detected in the C station and the LOL is detected, the switching of the SEL is not executed until the delay time passes. As a result, the restoration is delayed by the delay time.

That is, when the optical switch where the delay time is set detects the failure, the switching of the SEL is not executed until the delay time passes. For this reason, the restoration is delayed by the delay time. As such, when the optical switches that have the switch control circuit with the timer function are used, the fluttering phenomenon of the optical switches when the failure is detected can be prevented, but a long failure restoration time may be taken according to the failure part.

SUMMARY

According to an aspect of an embodiment of the invention, a light transmission device includes a subsignal generator circuit that generates a subsignal having the wavelength different from the wavelength of a data signal corresponding to a signal to be transmitted; a signal transmitter that transmits an optical signal where the subsignal generated by the subsignal generator circuit and the data signal are multiplexed; an optical switch that switches a reception path of the optical signal; a subsignal determiner circuit that determines whether the subsignal is included in the received optical signal, when the data signal is not included in the received optical signal; and a switch control processor that maintains a connection path of the optical switch without switching the connection path, when it is determined by the subsignal determiner circuit that the subsignal is included.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is a diagram illustrating an example of operation determination information;

FIG. 9 is a diagram illustrating an example of operation determination information;

FIG. 10 is a flowchart illustrating a flow of switching determination processing;

DESCRIPTION OF EMBODIMENTS

Preferred embodiments of the present invention will be explained with reference to accompanying drawings. However, the present invention is not limited by the embodiments.

[a] First Embodiment

Figure 1:
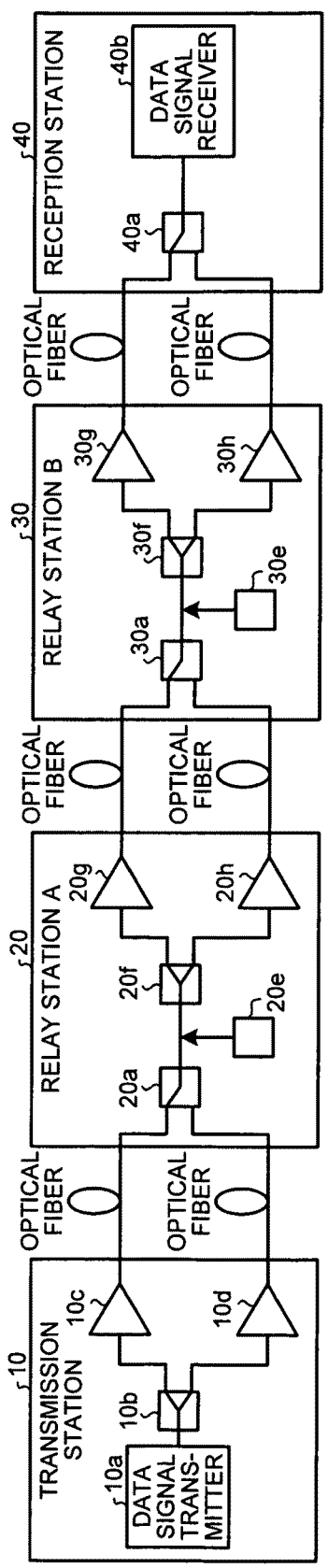
FIG. 1 is a diagram illustrating an example of a light transmission system according to a first embodiment.

FIG. 1 illustrates an example of a light transmission system according to a first embodiment. As illustrated in FIG. 1, the light transmission system has a transmission station, a relay station A, a relay station B, and a reception station and these stations are connected by optical fibers of two paths respectively. In the light transmission system, an optical signal that is transmitted from the transmission station is transmitted to the reception station through the relay station A and the relay station B.

Configuration of the Transmission Station

As illustrated in FIG. 1, a transmission station 10 has a data signal transmitter 10a, an optical coupler 10b, an optical amplifier 10c, and an optical amplifier 10d. The data signal transmitter 10a generates a data signal to be transmitted and outputs the data signal to the optical coupler 10b. The optical coupler 10b is a splitter that equally distributes the data signal output from the data signal transmitter 10a to the optical amplifier 10c and the optical amplifier 10d. The optical amplifiers 10c and 10d amplify the data signal distributed by the optical coupler 10b to constant optical power, and transmit the amplified signal as an optical signal to a relay station A 20.

Configuration of the Relay Station

Figure 2:
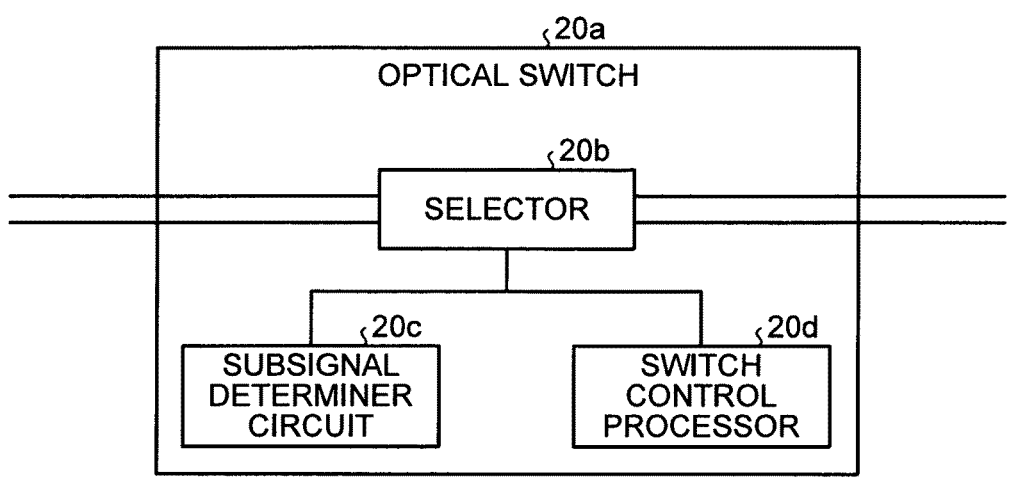
FIG. 2 is a functional block diagram illustrating the configuration of an optical switch according to the first embodiment.

As illustrated in FIG. 1, the relay station A 20 has an optical switch 20a, a sub light source 20e, an optical coupler 20f, an optical amplifier 20g, and an optical amplifier 20h. As illustrated in FIG. 2, the optical switch 20a has a selector 20b, a subsignal determiner circuit 20c, and a switch control processor 20d and switches a reception path of an optical signal that is received by the relay station A 20.

The selector 20b performs a control operation to receive the optical signal transmitted from the optical amplifier 10c of the transmission station 10 and receive an optical signal transmitted from the optical amplifier 10d of the transmission station 10 by an instruction operation of the switch control processor 20d, and switches the reception path. When a data signal to be transmitted is not included in the received optical signal, the subsignal determiner circuit 20c determines whether a subsignal having the wavelength different from the wavelength of the data signal is included in the optical signal and outputs the determination result to the switch control processor 20d. When the subsignal determiner circuit 20c determines that the subsignal is included in the received optical signal, the switch control processor 20d maintains a current connection path without switching the path. That is, the switch control processor 20d suppresses the switch control of the selector 20b, while the relay station A 20 receives the subsignal. FIG. 2 is a functional block diagram illustrating the configuration of an optical switch according to the first embodiment.

Referring back to FIG. 1, the sub light source 20e generates a subsignal that has the wavelength different from the wavelength of a data signal corresponding to a signal to be transmitted and generates an optical signal where the generated subsignal and the data signal are multiplexed. For example, the sub light source 20e multiplexes the subsignal with the data signal received by the optical switch 20a. The optical coupler 20f is a splitter that equally distributes the optical signal where the subsignal are multiplexed with the data signal received by the optical switch 20a to the optical amplifier 20g and the optical amplifier 20h. The optical amplifier 20g and the optical amplifier 20h amplify the optical signal distributed by the optical coupler 20f to the constant optical power and transmit the optical signal to a relay station B 30.

Since the relay station B 30 has the same configuration as that of the relay station A 20, the description is not repeated. Specifically, an optical switch 30a, an sub light source 30e, an optical coupler 30f, an optical amplifier 30g, and an optical amplifier 30h of the relay station B 30 correspond to the optical switch 20a, the sub light source 20e, the optical coupler 20f, the optical amplifier 20g, and the optical amplifier 20h of the relay station A 20 respectively.

Configuration of the Reception Station

As illustrated in FIG. 1, a reception station 40 has an optical switch 40a and a data signal receiver 40b. The optical switch 40a is a switch that switches a reception path of the optical signal received from the relay station B 30 and has the same function as that of the optical switch 20a of the relay station A 20 illustrated in FIG. 2. The data signal receiver 40b terminates the optical signal that is received by the optical switch 20a and extracts the data signal from the optical signal.

Figure 3:
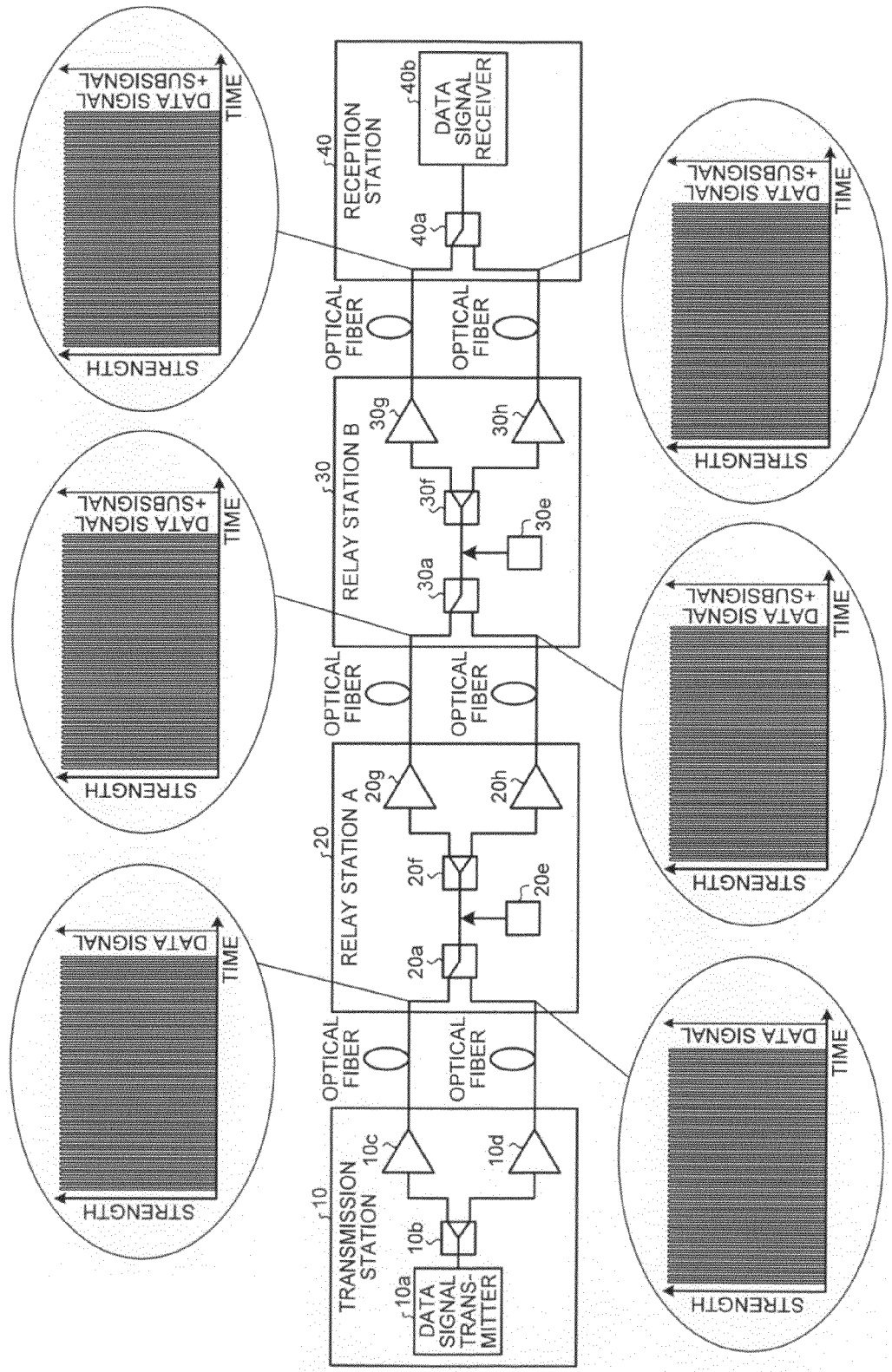
FIG. 3 is a diagram illustrating a signal waveform in a place of the optical switch.
Figure 4:
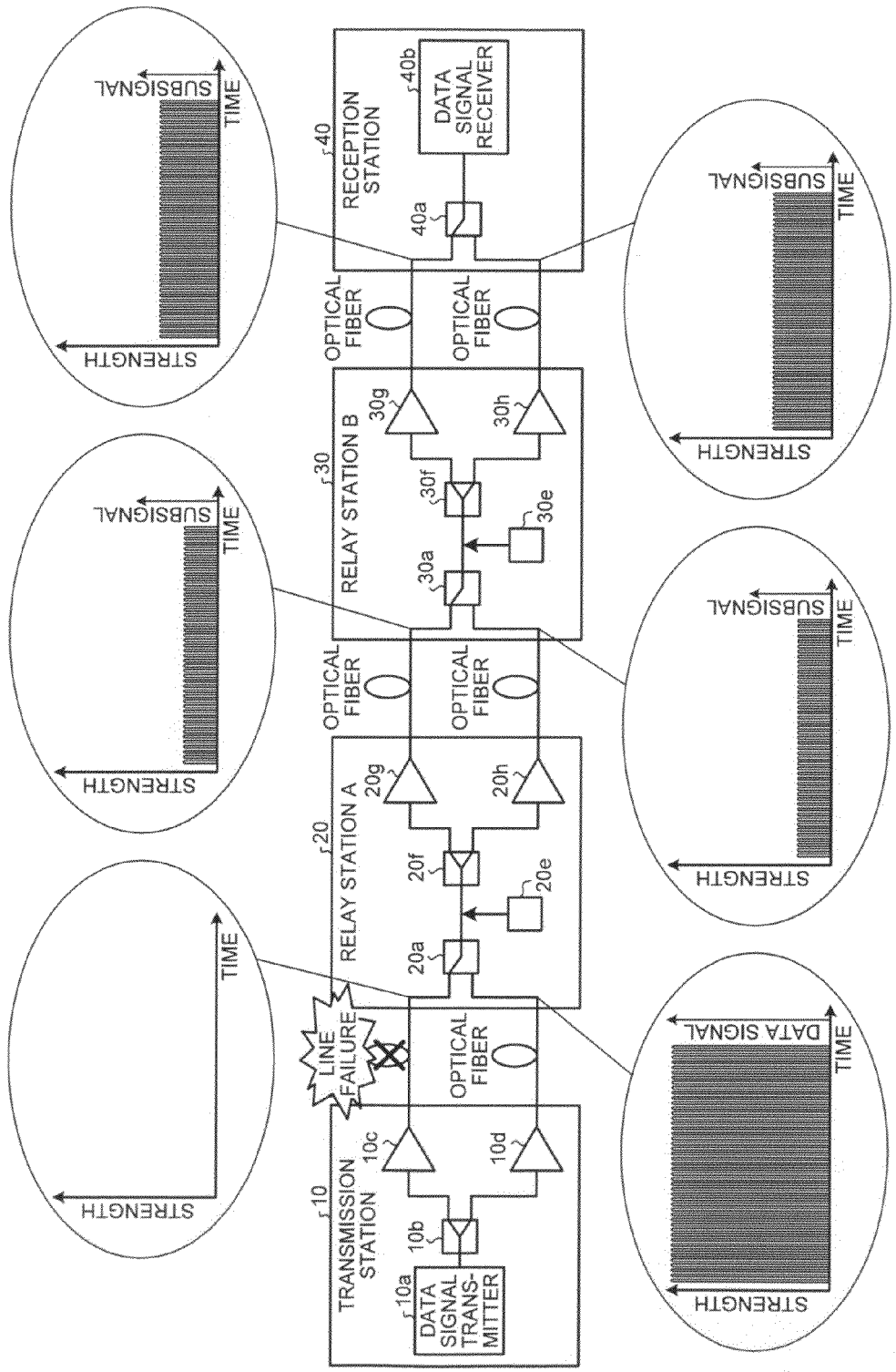
FIG. 4 is a diagram illustrating a signal waveform immediately after a line failure is generated between a transmission station and a relay station A.
Figure 5:
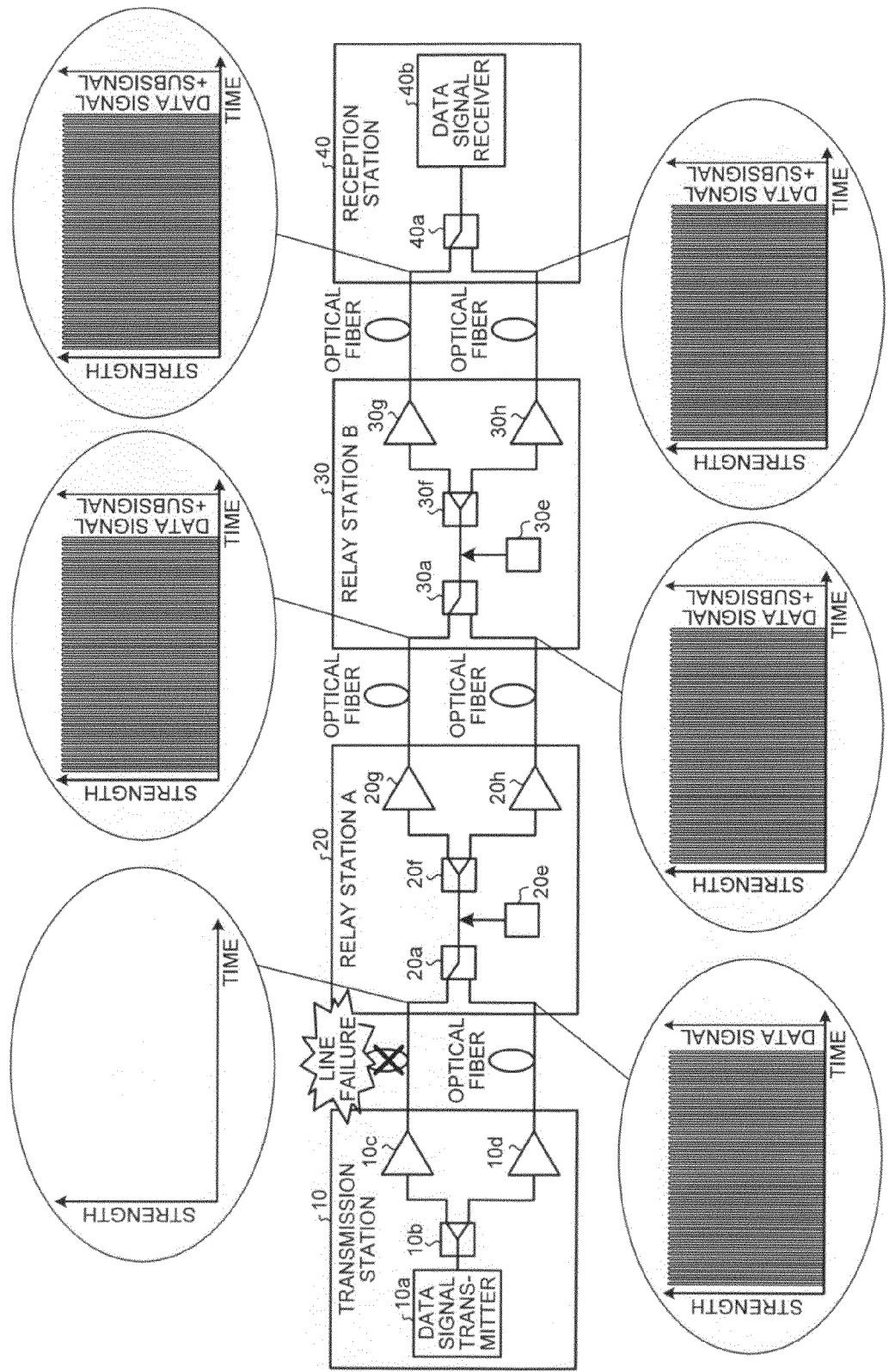
FIG. 5 is a diagram illustrating a signal waveform in the case where the line failure generated between a transmission station and the relay station A is restored.

Example of the Operation of the Optical Switch from Generation of a Failure to Restoration Next, the operation of the optical switch from the generation of the failure to the restoration in the light transmission system illustrated in FIG. 1 will be described using FIGS. 3 to 5. FIG. 3 illustrates a signal waveform in a place of the optical switch, FIG. 4 illustrates a signal waveform immediately after a line failure is generated between the transmission station and the relay station A, and FIG. 5 illustrates a signal waveform in the case where the line failure generated between the transmission station and the relay station A is restored.

A Signal Waveform in a Normal State

As illustrated in FIG. 3, when there is no line (path) where a failure is generated, the data signal is transmitted from each side of the optical amplifier 10c and the optical amplifier 10d of the transmission station 10 to the optical switch 20a of the relay station A 20. Since the optical switch 20a of the relay station A 20 is connected to the side of the optical amplifier 10c of the transmission station 10, the optical switch 20a receives the data signal from the side of the optical amplifier 10c.

The optical signal where the data signal and the subsignal are multiplexed is transmitted from each side of the optical amplifier 20g and the optical amplifier 20h of the relay station A 20 to the optical switch 30a of the relay station B 30. Since the optical switch 30a of the relay station B 30 is connected to the side of the optical amplifier 20g of the relay station A 20, the optical switch 30a receives the optical signal from the side of the optical amplifier 20g. The optical signal where the data signal and the subsignal are multiplexed is transmitted from each side of the optical amplifier 30g and the optical amplifier 30h of the relay station B 30 to the optical switch 40a of the reception station 40. Since the optical switch 40a of the reception station 40 is connected to the side of the optical amplifier 30g of the relay station B 30, the optical switch 40a receives the optical signal from the side of the optical amplifier 30g.

A Signal Waveform in an Abnormal State

In the state of FIG. 3, the failure is generated in the optical fiber between the optical amplifier 10c of the transmission station 10 and the optical switch 20a of the relay station A 20, as illustrated in FIG. 4. In this case, an input of the data signal from the side of the optical amplifier 10c of the transmission station 10 to the optical switch 20a of the relay station A 20 is stopped and the data signal is transmitted from the side of the optical amplifier 10d to the optical switch 20a. That is, the optical switch 20a of the relay station A 20 that is connected to the optical amplifier 10c detects a loss of light (LOL). As a result, since the data signal is not output from the optical switch 20a of the relay station A 20, the optical coupler 20f distributes only the subsignal to the optical amplifier 20g and the optical amplifier 20h. Therefore, only the subsignal is transmitted from the relay station A 20 to the relay station B 30.

At this time, the optical switch 30a of the relay station B 30 receives only the subsignal that is output from the optical amplifier 20g of the relay station A 20, as illustrated in FIG. 4. The optical switch 30a determines that the data signal is not included in the received optical signal but the subsignal is included therein, and maintains the reception path without switching the reception path. For this reason, the data signal is not output and only the subsignal is output from the optical switch 30a of the relay station B 30, and the optical coupler 30f distributes an optical signal where the subsignal is further multiplexed to the optical amplifier 30g and the optical amplifier 30h. Therefore, only the subsignal is transmitted from the relay station B 30 to the reception station 40.

Likewise, the optical switch 40a of the reception station 40 receives only the subsignal that is output from the optical amplifier 30g of the relay station B 30, as illustrated in FIG. 4. The optical switch 40a determines that the data signal is not included in the received optical signal but the subsignal is included therein, and maintains the reception path without switching the reception path.

As described above, even when the optical switch 20a of the relay station A 20 detects the LOL, in the optical switch 30a of the relay station B 30 and the optical switch 40a of the reception station 40, the data signal is not received, but the subsignal can be normally received. As a result, the optical switch 30a of the relay station B 30 and the optical switch 40a of the reception station 40 suppress path switching, that is, suppress switching of the selector and maintain current connection.

A Signal Waveform after Restoration

After detecting the LOL, the optical switch 20a of the relay station A 20 executes the path switching, because the data signal and the subsignal are not included in the received signal, as illustrated in FIG. 5. That is, the optical switch 20a of the relay station A 20 switches the connection from connection with the optical amplifier 10c of the transmission station 10 to connection with the optical amplifier 10d. That is, the optical switch 20a switches a path where the optical signal is received from the optical amplifier 10c into a path where the optical signal is received from the optical amplifier 10d. As a result, the relay station A 20 can receive the optical signal from the optical amplifier 10d of the transmission station 10 and receive a normal signal. Therefore, similar to the case of FIG. 2, the optical signal is transmitted to the relay station B 30 and the reception station 40. As a result, as illustrated in FIG. 5, the optical signal where the data signal and the subsignal are multiplexed can be received.

Effect According to the First Embodiment

As such, according to the first embodiment, unnecessary switching of the optical switches based on the failure detection can be prevented and a failure restoration time can be decreased. Specifically, even when the failure is detected in the optical switch 20a of the relay station A 20, the switching is controlled not to be executed, because the subsignal can be received in the optical switch 30a of the relay station B 30 and the optical switch 40a of the reception station 40. As a result, unnecessary switching of the optical switches based on the generation of the failure can be prevented. That is, fluttering of the optical switches based on the generation of the failure can be prevented. Since the delay time is not set to the optical switch, the optical switch that detects the failure can quickly execute the path switching. Therefore, the failure restoration time can be decreased.

[b] Second Embodiment

Meanwhile, the optical switches and the light transmission system herein can be applied to an optical network using wavelength division multiplexing (WDM), in addition to the light transmission system according to the first embodiment. Therefore, in the second embodiment, an example of the optical network using the WDM will be described.

Entire Configuration

Figure 6:
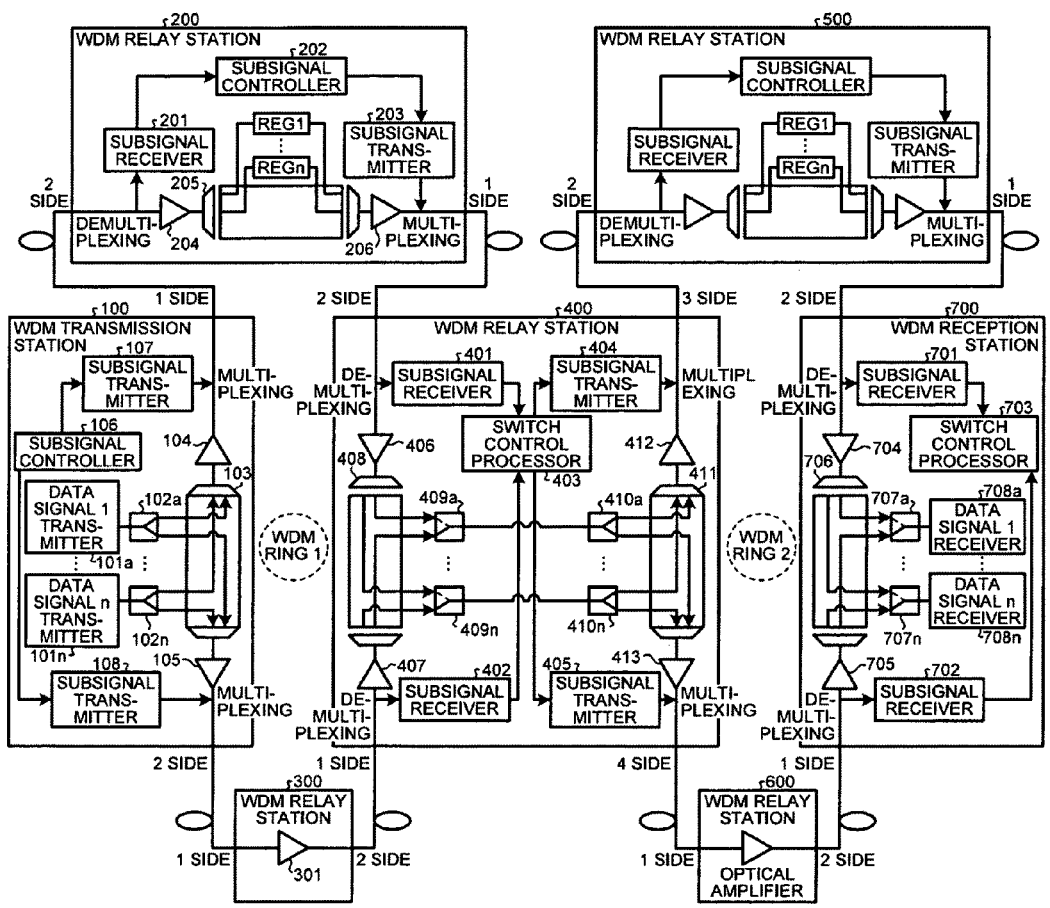
FIG. 6 is a diagram illustrating the entire configuration of an optical network according to a second embodiment.

First, the entire configuration of the optical network according to the second embodiment will be described using FIG. 6. FIG. 6 illustrates the entire configuration of the optical network according to the second embodiment. As illustrated in FIG. 6, in the optical network, a WDM transmission station 100, a WDM relay station 200, a WDM relay station 300, a WDM relay station 400, a WDM relay station 500, a WDM relay station 600, and a WDM reception station 700 are connected by optical fibers and two WDM rings are formed.

The WDM transmission station 100 is an ingress station that transmits a data signal to be transmitted to the WDM reception station 700 and the WDM reception station 700 is an egress station that receives the data signal from the WDM transmission station 100. Each of the WDM relay station 300 and the WDM relay station 600 is a line relay station that has only an optical amplifier and each of the WDM relay station 200 and the WDM relay station 500 is a regenerative relay station that can prevent deterioration of a transmission waveform or accumulation of noises.

Next, a transmission path of an optical signal in the optical network illustrated in FIG. 6 will be simply described. The WDM transmission station 100 generates a WDM signal where a subsignal is multiplexed with a signal obtained by multiplying data signals transmitted from a data signal 1 transmitter to a data signal n transmitter. The WDM transmission station 100 transmits the WDM signal in both directions of the 1 side of a WDM LINE to which the WDM relay station 200 is connected and the 2 side of the WDM LINE to which the WDM relay station 300 is connected.

Next, the WDM relay station 200 causes the data signal obtained by demultiplexing the subsignal from the WDM signal received from the WDM transmission station 100 to pass through a regenerator (hereinafter, referred to as REG), and prevents deterioration of a transmission waveform or accumulation of noises. The WDM relay station 200 generates a WDM signal where the subsignal is multiplexed with the data signal having passed through the REG, and transmits the WDM signal to the WDM relay station 400. Meanwhile, the WDM relay station 300 amplifies the WDM signal received from the WDM transmission station 100 to a constant optical power and transmits the WDM signal to the WDM relay station 400.

Next, the WDM relay station 400 selects one of the WDM signal received from the WDM relay station 200 and the WDM signal received from the WDM relay station 300 used as a drop signal, by the optical switch. The WDM relay station 400 multiplexes the subsignal with the WDM signal dropped by the optical switch and transmits the multiplexed signal to both directions of the 3 side of the WDM LINE to which the WDM relay station 500 is connected and the 4 side of the WDM LINE to which the WDM relay station 600 is connected.

Next, the WDM relay station 500 executes the same processing as that of the WDM relay station 200 and transmits the WDM signal to the WDM reception station 700. The WDM relay station 600 executes the same processing as that of the WDM relay station 300 and transmits the WDM signal to the WDM reception station 700.

Then, similar to the WDM relay station 400, the WDM reception station 700 selects one of the WDM signal received from the WDM relay station 500 and the WDM signal received from the WDM relay station 600 used as a drop signal, by the optical switch. As a result, the WDM reception station 700 can receive the WDM signal that is transmitted from the WDM transmission station 100, and receive the data signal to be transmitted.

Configuration of Each Device

Next, the configuration of each device that is included in the optical network illustrated in FIG. 6 will be described. In this case, each device will be described in order of the WDM transmission station 100, the WDM relay station 200, the WDM relay station 300, the WDM relay station 400, the WDM relay station 500, the WDM relay station 600, and the WDM reception station 700.

Configuration of the WDM Transmission Station 100

The WDM transmission station 100 has data signal 1 transmitter 101a to data signal n transmitter 101n (n is an arbitrary natural number), optical couplers 102a to 102n (n is an arbitrary natural number same as for the data signal), and an array waveguide gating (AWG) 103. The WDM transmission station 100 has an optical amplifier 104, an optical amplifier 105, a subsignal controller 106, a subsignal transmitter 107, and a subsignal transmitter 108.

The data signal 1 transmitter 101a to data signal n transmitter 101n are connected to the optical couplers 102a to 102n, respectively, generate data signals where desired data is included in a payload, and output the data signals to the optical couplers, respectively. For example, the data signal 1 transmitter 101a generates the data signal and outputs the data signal to the optical coupler 102a, the data signal 3 transmitter 101c generates the data signal and outputs the data signal to the optical coupler 102c, and the data signal 7 transmitter 101g generates the data signal and outputs the data signal to the optical coupler 102g. The data signal transmitters are provided by a multiplexing (channel) number to be arbitrarily set. That is, when the multiplexing number is defined as 10, the data signal 1 transmitter 101a to data signal 10 transmitter 101j are provided as the data signal transmitters.

The optical couplers 102a to 102n equally distribute the data signals output from the data signal 1 transmitter 101a to the data signal n transmitter 101n to two systems and output the data signals to the AWG 103. For example, the optical coupler 102a equally distributes the data signal received from the data signal 1 transmitter 101a to the two systems for transmission with respect to the WDM relay station 200 and transmission with respect to the WDM relay station 300 and outputs the data signal to the AWG 103. The optical couplers are disposed by the number of data signal transmitters.

The AWG 103 multiplexes the data signals of the two systems output from the optical couplers 102a to 102n and outputs the multiplexed signal to the optical amplifier. For example, the AWG 103 multiplexes the data signals that are output from the optical couplers 102a to 102n as signals transmitted to the WDM relay station 200, and outputs the multiplexed signal to the optical amplifier 104. Likewise, the AWG 103 multiplexes the data signals that are output from the optical couplers 102a to 102n as signals transmitted to the WDM relay station 300, and outputs the multiplexed signal to the optical amplifier 105.

The optical amplifier 104 amplifies the data signal output from the AWG 103 to the constant optical power and outputs the data signal to the WDM relay station 200. Likewise, the optical amplifier 105 amplifies the data signal output from the AWG 103 to the constant optical power and outputs the data signal to the WDM relay station 300.

The subsignal controller 106 generates control information of the subsignal that is multiplexed with the data signal output from the optical amplifier 104 or the optical amplifier 105. Specifically, the subsignal controller 106 generates flag contents of "WCS flag, switching permission flag, and failure detection flag" for each of the multiplexed channels. The subsignal controller 106 outputs the subsignal for each of the channels to the subsignal transmitter 107 and the subsignal transmitter 108.

In this case, the generated "WCS flag" is information that indicates an operation/non-operation state of the light wavelength. In the case of the operation state, "ON" is set and in the case of the non-operation state, "OFF" is set. The "switching permission flag" is information that indicates permission of switching of the optical switch with respect to a downstream node becoming the transmission destination of the data signal. In the case where the switching of the optical switch is permitted, "ON (enable)" is set, and in the case where the switching is not permitted, "OFF (disable)" is set. The "failure detection flag" is information that urges the switching of the optical switch with respect to the downstream node. In the case where the switching of the optical switch with respect to the downstream node is executed, "ON" is set and in the case where the switching of the optical switch with respect to the downstream side is not executed, "OFF" is set.

Figure 7:
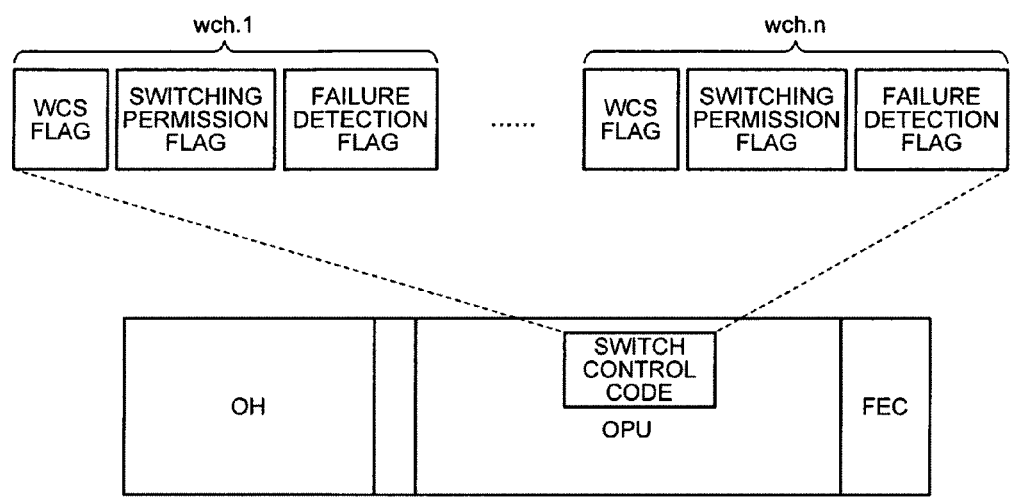
FIG. 7 is a diagram illustrating an example of a subsignal using an OTN frame.

Next, an example of a data frame of the subsignal that is generated by the subsignal controller 106 will be described using FIG. 7. FIG. 7 illustrates an example of a subsignal using an optical transport network (OTN) frame. As illustrated in FIG. 7, the OTN frame has an overhead (OH) that includes information such as a frame alignment signal (FAS), an optical channel payload unit (OPU) that indicates a payload region, and forward error correction (FEC) that indicates an error correction signal. The subsignal controller 106 provides a region of a switch control code in the OPU of the OTN frame and stores a flag for each of the channels (wch.1 to wch.n) in the region. The flag of each channel has "the WCS flag, the switching permission flag, and the failure detection flag".

In this case, in the stored "WCS flag, switching permission flag, and failure detection flag", "ON, ON, and OFF" are set as default values. That is, in each of the devices that receive the subsignals where the default values are set, the optical network is in the operation state and the optical switch can be switched at arbitrary timing. However, the switching based on the failure is not permitted.

In this state, when the operation state is changed to the non-operation state according to an instruction operation from a manager and the like, the subsignal controller 106 generates a subsignal where the "WCS flag" is changed from "ON" to "OFF". When the LINE failure is generated in the 1 side or the 2 side, the subsignal controller 106 generates a subsignal where the "switching permission flag" is changed from "ON" to "OFF" and transmits the subsignal to the downstream side, thereby preventing the fluttering of the optical switch. When the subsignal controller 106 detects the failure and the optical switch is to be immediately switched, the subsignal controller 106 generates a subsignal where the "failure detection flag" is changed from "OFF" to "ON" and transmits the subsignal to the downstream side, thereby urging the optical switch to be immediately switched.

Referring back to FIG. 6, the subsignal transmitter 107 generates a WDM signal where the subsignal generated by the subsignal controller 106 is multiplexed with the data signal output from the optical amplifier 104, and transmits the generated WDM signal to the WDM relay station 200 that is connected by the optical fiber. The subsignal transmitter 108 generates a WDM signal where the subsignal generated by the subsignal controller 106 is multiplexed with the data signal output from the optical amplifier 105, and transmits the generated WDM signal to the WDM relay station 300 that is connected by the optical fiber.

Configuration of the WDM Relay Station 200

As illustrated in FIG. 6, the WDM relay station 200 is a regenerative relay station that has a subsignal receiver 201, a subsignal controller 202, a subsignal transmitter 203, an optical amplifier 204, an AWG 205, REG1 to REGn, and an optical amplifier 206.

The subsignal receiver 201 demultiplexes the subsignal from the WDM signal that is received from the WDM transmission station 100. For example, the subsignal receiver 201 acquires only the subsignal from the WDM signal that is received from the WDM transmission station 100 and outputs the subsignal to the subsignal controller 202. As a result, only the data signal of the WDM signal that is received from the WDM transmission station 100 is input to the optical amplifier 204.

The subsignal controller 202 refers to a switch control code that is included in the subsignal and executes various processing. The subsignal controller 202 determines a control code included in the subsignal according to a state of the data signal output from the REG1 to REGn. Specifically, the subsignal controller 202 stores operation determination information illustrated in FIG. 8 and generates the switch control code on the basis of the operation determination information. The operation determination information may be stored in a storage unit such as a memory of the WDM relay station 200 and may be stored in an internal memory of the subsignal controller 202. FIG. 8 illustrates an example of the operation determination information.

As illustrated in FIG. 8, the operation determination information has "an input power level of the subsignal, an input power level of the data signal, and operation contents". The "input power level of the subsignal" is information that is specified according to whether the subsignal is input to the subsignal controller 202 or a state of the "failure detection flag" included in the subsignal. "The input power level of the data signal" is information that is specified according to whether the data signal is input to each of the REG1 to the REGn. The "operation contents" are contents of an operation that is executed by the subsignal controller 202, according to the state that is specified by "the input power level of the subsignal and the input power level of the data signal".

For example, the subsignal controller 202 stores "signal non-existence, signal non-existence, and setting of failure detection flag=ON and switching permission flag=ON to the downstream side" as "the input power level of the subsignal, the input power level of the data signal, and the operation contents" of the operation determination information. The subsignal controller 202 stores "signal existence and failure detection flag=ON, signal non-existence, and transmission of the failure detection flag and the switching permission flag" and "signal existence and failure detection flag=OFF, signal non-existence, and transmission of the failure detection flag and the switching permission flag". The subsignal controller 202 stores "signal non-existence, signal existence, and maintaining of a previous value of the failure detection flag and setting of switching permission flag=ON". The subsignal controller 202 stores "signal existence and failure detection flag=ON, signal existence, and transmission of the failure detection flag and the switching permission flag" and "signal existence and failure detection flag=OFF, signal existence, and transmission of the failure detection flag and the switching permission flag".

Specifically, when the subsignal and the data signal may not be normally received, the subsignal controller 202 generates a subsignal where "failure detection flag=ON" and "switching permission flag=ON" are set and transmits the subsignal to the downstream side. When the data signal can be received but the subsignal may not be received, the subsignal controller 202 generates a subsignal where the "failure detection flag" included in the received subsignal is not changed and "switching permission flag=ON" is set, and transmits the subsignal to the downstream side. When the subsignal can be received but the data signal may not be received, the subsignal controller 202 generates a subsignal where the "value of the failure detection flag" included in the previously received subsignal is set as the "failure detection flag and "switching permission flag=ON" is set and transmits the subsignal to the downstream side. When both the subsignal and the data signal can be normally received, the subsignal controller 202 generates a subsignal where the "failure detection flag" and the "switching permission flag" included in the received subsignal are not changed and transmits the subsignal to the downstream side. The information of the previously received subsignal can be stored in the predetermined storage area.

That is, when the "failure detection flag" is "ON", the failure is generated at the upstream side and immediate switching is performed. Therefore, the subsignal controller 202 generates a subsignal where the "failure detection flag" of each channel is set to "ON". When the REG3 may not generate the data signal due to the failure, for example, the subsignal controller 202 generates a subsignal where the "failure detection flag" corresponding to the REG3 is set to "ON".

When the failure (for example, LOS, LOF, and BERSF/SD) is generated in the signal input to the REG1, the subsignal controller 202 determines that the data signal 1 may not be correctly received. The subsignal controller 202 generates a subsignal of "failure detection flag=ON and switching permission flag=ON" corresponding to the channel 1 and transmits the subsignal to the downstream side. The subsignal controller 202 can request to switch the optical switch in a node where the optical switch of the downstream side is mounted.

The subsignal transmitter 203 generates a WDM signal where the subsignal including the switch control code for each of the channels generated by the subsignal controller 202 is multiplexed with the data signal output from the optical amplifier 206 to be described below. The generated WDM signal is output to the WDM relay station 400.

The optical amplifier 204 amplifies the data signal of the WDM signal received from the WDM transmission station 100 other than the subsignal demultiplexed by the subsignal receiver 201 to the constant optical power, and outputs the data signal to the AWG 205.

The AWG 205 divides (demultiplexes) the data signal output from the optical amplifier 204 into the data signal for each of the channels, that is, each frequency. The AWG 205 outputs the divided data signal for each frequency to the corresponding REG. For example, the AWG 205 demultiplexes the data signal output from the optical amplifier 204 into a data signal 1, a data signal 2, . . . , and a data signal n. The AWG 205 outputs the demultiplexed data signal 1, data signal 2, . . . , and data signal n to the REG1, the REG2, . . . , and the REGn, respectively. The AWG 205 multiplexes the data signal 1, the data signal 2, . . . , and the data signal n that are output from the REG1, the REG2, . . . , and the REGn, respectively, so as to generate a data signal, and outputs the multiplexed data signal to the optical amplifier 206.

Each of the REG1 to REGn is a 3R regenerator card that converts the data signal corresponding to the frequency signal output from the AWG 205 into an electric signal, further converts the electric signal into the data signal of the frequency signal, and outputs the converted signal to the AWG 205. For example, even when each of the REG1 to REGn may not receive the data signal from the AWG 205, each of the REG1 to REGn newly generates a data signal where a payload is empty and outputs the data signal to the AWG 205. In this case, each of the REG1 to REGn notifies the subsignal controller 202 that the data signal is newly generated. The subsignal controller 202 that receives the notification sets "failure detection flag=ON and switching permission flag=ON" to a channel where the data signal is newly generated.

The optical amplifier 206 amplifies the data signal output from the AWG 205 to the constant optical power and outputs the data signal to the WDM relay station 400. The subsignal transmitter 203 multiplexes the subsignal with the data signal output from the optical amplifier 206. The WDM signal where the data signal and the subsignal are multiplexed is output to the WDM relay station 400.

Configuration of the WDM Relay Station 300

As illustrated in FIG. 6, the WDM relay station 300 is a line relay station that has an optical amplifier 301. The optical amplifier 301 amplifies the WDM signal output from the WDM transmission station 100 to the constant optical power and transmits the WDM signal to the WDM relay station 400. As a result, the optical power of the WDM signal deteriorated in the transmission path can be amplified to relay the WDM signal.

Configuration of the WDM Relay Station 400

As illustrated in FIG. 6, the WDM relay station 400 has a subsignal receiver 401, a subsignal receiver 402, a switch control processor 403, a subsignal transmitter 404, and a subsignal transmitter 405. The WDM relay station 400 further has an optical amplifier 406, an optical amplifier 407, an AWG 408, optical switches 409a to 409n, optical couplers 410a to 410n, an AWG 411, an optical amplifier 412, and an optical amplifier 413.

The subsignal receiver 401 demultiplexes the subsignal from the WDM signal that is received from the WDM relay station 200. For example, the subsignal receiver 401 acquires only the subsignal from the WDM signal that is received from the WDM relay station 200 and outputs the subsignal to the switch control processor 403. As a result, only the data signal of the WDM signal that is received from the WDM relay station 200 is input to the optical amplifier 406. Likewise, the subsignal receiver 402 demultiplexes the subsignal from the WDM signal that is received from the WDM relay station 300. For example, the subsignal receiver 402 acquires only the subsignal from the WDM signal that is received from the WDM relay station 300 and outputs the subsignal to the switch control processor 403. As a result, only the data signal of the WDM signal that is received from the WDM relay station 300 is input to the optical amplifier 407.

The switch control processor 403 executes switch control of each of the optical switches 409a to 409n on the basis of the switch control code included in the received subsignal and generates a subsignal that is transmitted to the downstream side. Specifically, the switch control processor 403 executes switching determination processing on each of the optical switches and outputs such as a switching instruction or a connection maintenance (non-switching) instruction to each of the optical switches. Since the switching determination processing executed by the switch control processor 403 is specially described using FIG. 10, the simple description is given herein. The switch control processor 403 can receive the subsignal from the subsignal receiver 401 or the subsignal receiver 402 with regard to the subsignal and can acquire an optical power level of the data signal from each of the optical switches 409a to 409n with regard to the optical power level of the data signal.

For example, in a state where the switch control processor 403 may not receive the subsignal from the WDM relay station to which the optical switch is connected, when the switch control processor 403 can receive the data signal from another WDM relay station to which the optical switch is not connected, the switch control processor 403 switches connection of the optical switch into another connection. The switch control processor 403 sets the "failure detection flag" of the subsignal received from the WDM relay station to which the optical switch is connected as "ON". In this case, when the "switching permission flag" of the subsignal received from another WDM relay station to which the optical switch is not connected is set to "ON" and the "failure detection flag" is set to "OFF", the switch control processor 403 switches connection of the optical switch into another connection. Meanwhile, when the "switching permission flag" of the subsignal received from another WDM relay station to which the optical switch is not connected is set to "OFF" or the "failure detection flag" is set to "ON", the switch control processor 403 maintains switches connection of the optical switch without switching the connection.

The switch control processor 403 determines the switch control code included in the subsignal transmitted to the downstream side according to the state of the received data signal or subsignal. The switch control processor 403 generates a subsignal that includes the determined switch control code and outputs the subsignal to the subsignal transmitter 404 and the subsignal transmitter 405 respectively.

Specifically, the switch control processor 403 stores operation determination information illustrated in FIG. 9 and generates the switch control code on the basis of the operation determination information. The operation determination information may be stored in a storage unit such as a memory of the WDM relay station 400 and may be stored in an internal memory of the switch control processor 403. FIG. 9 illustrates an example of the operation determination information.

As illustrated in FIG. 9, the operation determination information has "an input power level of the subsignal, an input power level of the data signal, and operation contents". Since "the input power level of the subsignal, the input power level of the data signal, and the operation contents" are the same as those in FIG. 8, the description is not repeated.

For example, the switch control processor 403 stores "signal non-existence, signal non-existence, and switching determination processing" and "signal existence and failure detection flag=ON, signal non-existence, and switching determination processing" as "the input power level of the subsignal, the input power level of the data signal, and the operation contents" of the operation determination information. The switch control processor 403 stores "signal existence and failure detection flag=OFF, signal non-existence, and transmission of the failure detection flag and the switching permission flag". The switch control processor 403 stores "signal non-existence, signal existence, and maintaining of a previous value of the failure detection flag and setting of switching permission flag=ON". The switch control processor 403 stores "signal existence and failure detection flag=ON, signal existence, and switching determination processing" and "signal existence and failure detection flag=OFF, signal existence, and transmission of the failure detection flag and the switching permission flag".

Specifically, the switch control processor 403 executes the switching determination processing illustrated in FIG. 10, on the basis of the determination reference illustrated in FIG. 9. When the switch control processor 403 can receive the subsignal of "failure detection flag=ON", the switch control processor 403 executes the switching determination processing illustrated in FIG. 10 without depending on whether the data signal can be received. When the optical switch is switched and both the data signal and the subsignal can be normally received, the switch control processor 403 generates a subsignal where each flag of the switch control code is configured to have a default value, and transmits the subsignal to the downstream side.

When the subsignal of "failure detection flag=ON" can be received but the "data signal may not be received", the switch control processor 403 executes the switching determination processing illustrated in FIG. 10. When the subsignal of "failure detection flag=OFF" can be received but the "data signal may not be received", the switch control processor 403 generates a subsignal where the "failure detection flag" and the "switching permission flag" included in the received subsignal are not changed and transmits the subsignal to the downstream side. When the "subsignal may not be received" but the "data signal can be received", the switch control processor 403 generates a subsignal where the "failure detection flag" is set as the "value of the failure detection flag" included in the previously received subsignal and "switching permission flag=ON" is set and transmits the subsignal to the downstream side. When the subsignal of "failure detection flag=OFF" can be received and the "data signal can be received", the switch control processor 403 generates a subsignal where the "failure detection flag" and the "switching permission flag" included in the received subsignal are not changed, and transmits the subsignal to the downstream side. The information of the previously received subsignal can be stored in the predetermined storage area. That is, when the failure is detected, the WDM relay station 400 switches the optical switch and restores the failure.

Referring back to FIG. 6, the subsignal transmitter 404 generates a WDM signal where the subsignal including the switch control code for each of the channels generated by the switch control processor 403 is multiplexed with the data signal output from the optical amplifier 412 to be described below. The generated WDM signal is output to the WDM relay station 500. Likewise, the subsignal transmitter 405 generates a WDM signal where the subsignal including the switch control code for each of the channels generated by the switch control processor 403 is multiplexed with the data signal output from the optical amplifier 413 to be described below. The generated WDM signal is output to the WDM relay station 600.

The optical amplifier 406 amplifies the data signal of the WDM signal received from the WDM relay station 200 other than the subsignal demultiplexed by the subsignal receiver 401 to the constant optical power, and outputs the data signal to the AWG 408. Likewise, the optical amplifier 407 amplifies the data signal of the WDM signal received from the WDM relay station 300 other than the subsignal demultiplexed by the subsignal receiver 402 to the constant optical power, and outputs the data signal to the AWG 408.

The AWG 408 divides (demultiplexes) the data signal output from the optical amplifier 406 into the data signal for each of the channels, that is, each frequency. The AWG 408 outputs the divided data signal for each frequency to the corresponding optical switch. For example, the AWG 408 demultiplexes the data signal output from the optical amplifier 406 into a data signal 1, a data signal 2, . . . , and a data signal n. The AWG 408 outputs the demultiplexed data signal 1, data signal 2, . . . , and data signal n to the optical switches 409a, 409b, . . . , and 409n, respectively.

The AWG 408 executes the same processing on the data signal that is output from the optical amplifier 407. Specifically, the AWG 408 divides (demultiplexes) the data signal into the data signal for each frequency and outputs the divided data signal for each frequency to the corresponding optical switch. For example, the AWG 408 demultiplexes the data signal output from the optical amplifier 407 into a data signal 1, a data signal 2, . . . , and a data signal n. The AWG 408 outputs the demultiplexed data signal 1, data signal 2, . . . , and data signal n to the optical switches 409a, 409b, . . . , and 409n, respectively.

Each of the optical switches 409a to 409n receives the data signal that is output from the AWG 408 and outputs the received optical power level to the switch control processor 403. Each of the optical switches 409a to 409n outputs the data signal received from the AWG 408 to each of the corresponding optical couplers 410a to 410n. Each of the optical switches 409a to 409n switches the selector to the side of the WDM relay station 200 or the side of the WDM relay station 300 according to the instruction operation of the switch control processor 403. The optical switches are disposed by the number of data signal transmitters.

Each of the optical couplers 410a to 410n equally distributes the data signal output from each of the optical switches 409a to 409n to the two systems and outputs the data signal to the AWG 411. For example, the optical coupler 410a equally distributes the data signal received from the optical switch 409a to the two systems for transmission with respect to the WDM relay station 500 and transmission with respect to the WDM relay station 600 and outputs the data signal to the AWG 411. The optical couplers are disposed by the number of data signal transmitters.

The AWG 411 multiplexes the data signals of the two systems output from the optical couplers 410a to 410n and outputs a multiplexed signal to the optical amplifier. For example, the AWG 411 multiplexes the data signals output from the optical couplers 410a to 410n as signals transmitted to the WDM relay station 500 and outputs a multiplexed signal to the optical amplifier 412. Likewise, the AWG 411 multiplexes the data signals output from the optical couplers 410a to 410n as signals transmitted to the WDM relay station 600 and outputs a multiplexed signal to the optical amplifier 413.

The optical amplifier 412 amplifies the data signal output from the AWG 411 to the constant optical power and outputs the data signal to the WDM relay station 500. Likewise, the optical amplifier 413 amplifies the data signal output from the AWG 411 to the constant optical power and outputs the data signal to the WDM relay station 600.

Configuration of the WDM Relay Station 500 and the WDM Relay Station 600

Since the WDM relay station 500 has the same configuration as that of the WDM relay station 200 and executes the same processing, the description is not repeated. Since the WDM relay station 600 has the same configuration as that of the WDM relay station 300 and executes the same processing, the description is not repeated.

Configuration of the WDM Reception Station 700

As illustrated in FIG. 6, the WDM reception station 700 has a subsignal receiver 701, a subsignal receiver 702, a switch control processor 703, an optical amplifier 704, an optical amplifier 705, and an AWG 706. The WDM reception station 700 further has optical switches 707a to 707n and data signal 1 receiver 708a to data signal n receiver 708n.

The subsignal receiver 701 demultiplexes the subsignal from the WDM signal that is received from the WDM relay station 500. For example, the subsignal receiver 701 acquires only the subsignal from the WDM signal that is received from the WDM relay station 500 and outputs the subsignal to the switch control processor 703. As a result, only the data signal of the WDM signal that is received from the WDM relay station 500 is input to the optical amplifier 704. Likewise, the subsignal receiver 702 demultiplexes the subsignal from the WDM signal that is received from the WDM relay station 600. For example, the subsignal receiver 702 acquires only the subsignal from the WDM signal that is received from the WDM relay station 600 and outputs the subsignal to the switch control processor 703. As a result, only the data signal of the WDM signal that is received from the WDM relay station 600 is input to the optical amplifier 705.

The switch control processor 703 executes switch control of each of the optical switches 707a to 707n on the basis of the switch control code included in the received subsignal. Specifically, the switch control processor 703 executes switching determination processing on each of the optical switches and outputs a switching instruction or a connection maintenance (non-switching) instruction to each of the optical switches. Since the switching determination processing executed by the switch control processor 703 is the same as the switching determination processing executed by the switch control processor 403 of the WDM relay station 400 specially described using FIG. 10, the description is not repeated.

The optical amplifier 704 amplifies the data signal of the WDM signal received from the WDM relay station 500 other than the subsignal demultiplexed by the subsignal receiver 701 to the constant optical power, and outputs the data signal to the AWG 706. Likewise, the optical amplifier 705 amplifies the data signal of the WDM signal received from the WDM relay station 600 other than the subsignal demultiplexed by the subsignal receiver 702 to the constant optical power, and outputs the data signal to the AWG 706.

The AWG 706 divides (demultiplexes) the data signal output from the optical amplifier 704 into the data signal for each of the channels, that is, each frequency. The AWG 706 outputs the divided data signal for each frequency to the corresponding optical switch. For example, the AWG 706 demultiplexes the data signal output from the optical amplifier 704 into a data signal 1, a data signal 2, . . . , and a data signal n. The AWG 706 outputs the demultiplexed data signal 1, data signal 2, . . . , and data signal n to the optical switches 707a, 707b, . . . , and 707n, respectively.

The AWG 706 executes the same processing on the data signal that is output from the optical amplifier 705. Specifically, the AWG 706 divides (demultiplexes) the data signal into the data signal for each frequency and outputs the divided data signal for each frequency to the corresponding optical switch. For example, the AWG 706 demultiplexes the data signal output from the optical amplifier 705 into a data signal 1, a data signal 2, . . . , and a data signal n. The AWG 706 outputs the demultiplexed data signal 1, data signal 2, . . . , and data signal n to the optical switches 707a, 707b, . . . , and 707n, respectively.

Each of the optical switches 707a to 707n receives the data signal that is output from the AWG 706 and outputs the received optical power level to the switch control processor 703. Each of the optical switches 707a to 707n outputs the data signal received from the AWG 706 to each of the corresponding data signal 1 receiver 708a to data signal n receiver 708n. Each of the optical switches 707a to 707n switches the selector to the side of the WDM relay station 500 or the side of the WDM relay station 600 according to the instruction operation of the switch control processor 703. The optical switches are disposed by the number of data signal transmitters.

Each of the data signal 1 receiver 708a to the data signal n receiver 708n receives the data signal and terminates the data signal. For example, the data signal 1 receiver 708a receives the data signal that is output from the optical switch 707a. As a result, the WDM reception station 700 can receive the data signal that is transmitted from the WDM transmission station 100. The switch control processor 703 can acquire the optical power level of the data signal from each of the data signal 1 receiver 708a to the data signal n receiver 708n.

Flow of the Switching Determination Processing

Next, a flow of the switching determination processing that is executed by the switch control processor 403 of the WDM relay station 400 or the switch control processor 703 of the WDM reception station 700 will be descried using FIG. 10. FIG. 10 is a flowchart illustrating a flow of the switching determination processing. The switch control processor 403 of the WDM relay station 400 or the switch control processor 703 of the WDM reception station 700 executes the switching determination processing for each optical switch. In this case, an example of the case where the switch control processor 403 of the WDM relay station 400 executes the switching determination processing will be described.

As illustrated in FIG. 10, the switch control processor 403 determines whether the "subsignal is received by the optical switches 409a to 409n" and the "switching permission flag" of the received subsignal is "ON" (step S101).

Next, when the "subsignal is received" and the "switching permission flag" of the received subsignal is "ON" (step S101: Yes), the switch control processor 403 executes step S102. Specifically, the switch control processor 403 determines whether the failure is not generated in the device of the switching destination and the "failure detection flag" of the subsignal received from the device of the switching destination is "OFF". That is, the switch control processor 403 determines whether a normal operation is performed from the relay station of the switching destination not connected to the optical switch at a current point of time and a normal WDM signal including a normal subsignal can be received.

When the failure is not generated in the device of the switching destination and the "failure detection flag" of the subsignal received from the device of the switching destination is "OFF" (step S102: Yes), the switch control processor 403 executes step S103. Specifically, the switch control processor 403 determines whether the "switching permission flag" of the subsignal received from the device of the switching destination is "ON". That is, the switch control processor 403 determines whether a WDM signal including a subsignal indicating permission of the switching can be received from the relay station of the switching destination that is not connected to the optical switch at a current point of time and normally operated.

When the "switching permission flag" of the subsignal received from the destination of the switching destination is "ON" (step S103: Yes), the switch control processor 403 instructs the optical switch to switch the selector to receive the WDM signal from the device of the switching destination (step S104).

That is, the switch control processor 403 executes switch control with respect to the optical switch that is determined as the optical switch where the determinations of steps S101 to S103 are all "Yes".

Meanwhile, the switch control processor 403 executes non-switch control with respect to the optical switch that is determined as the optical switch where any of steps S101 to S103 is "No" (step S105). That is, the switch control processor 403 instructs the optical switch to maintain the current connection without executing switching of the selector.

Transition of a State from Generation of a Failure to Restoration

Next, control of each optical switch until the failure is generated and restored in the optical network illustrated in FIG. 6 will be described. In this case, a first failure example where a line failure is generated between the WDM relay station 300 and the WDM relay station 400 will be described using FIGS. 11 and 12 and a second failure example where a line failure is generated between the WDM transmission station 100 and the WDM relay station 200 will be described using FIGS. 13 and 14.

First Failure Example

Figure 11:
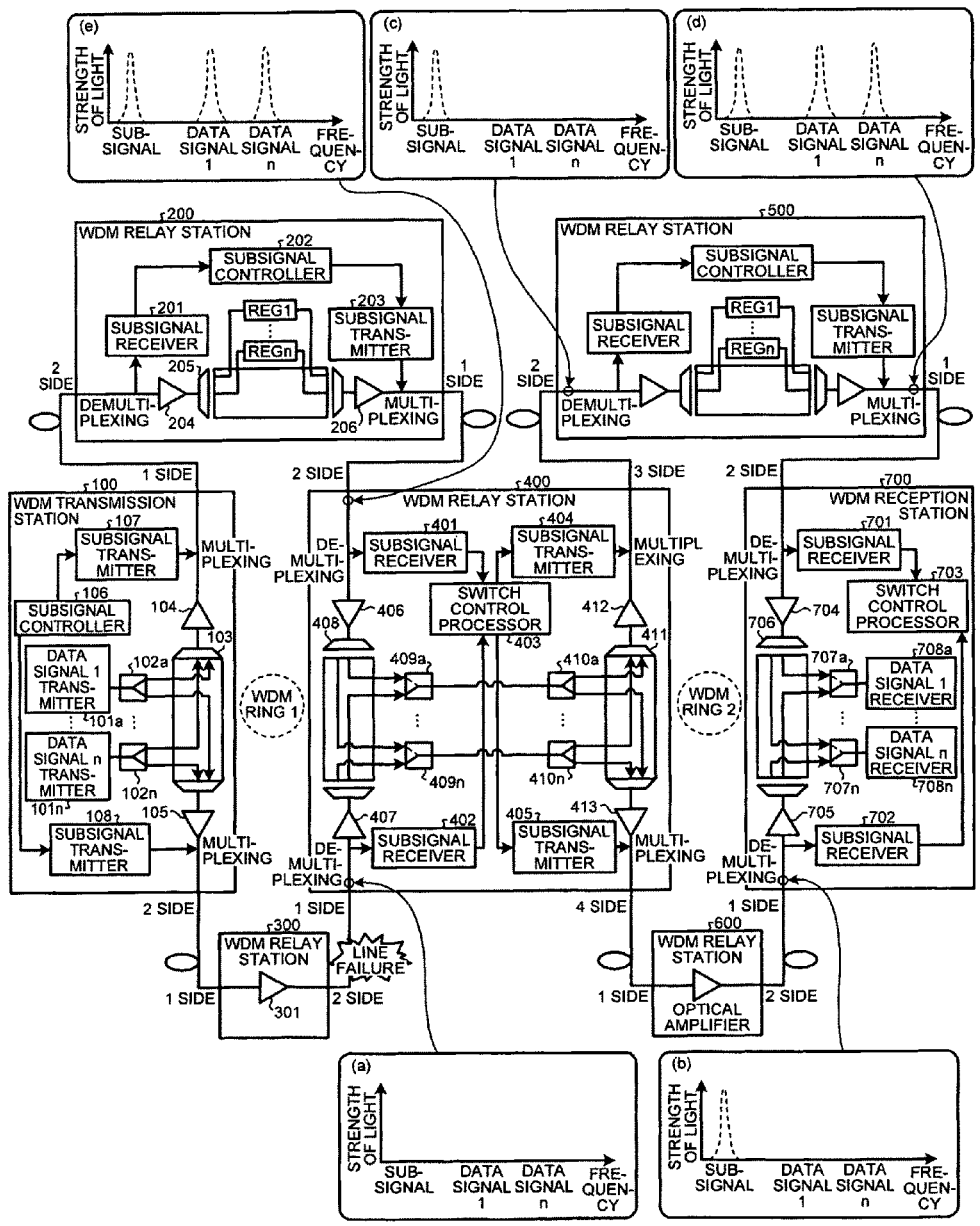
FIG. 11 is a diagram illustrating an example of the case where a line failure is generated between a WDM relay station 300 and a WDM relay station 400 in the optical network according to the second embodiment.
Figure 12:
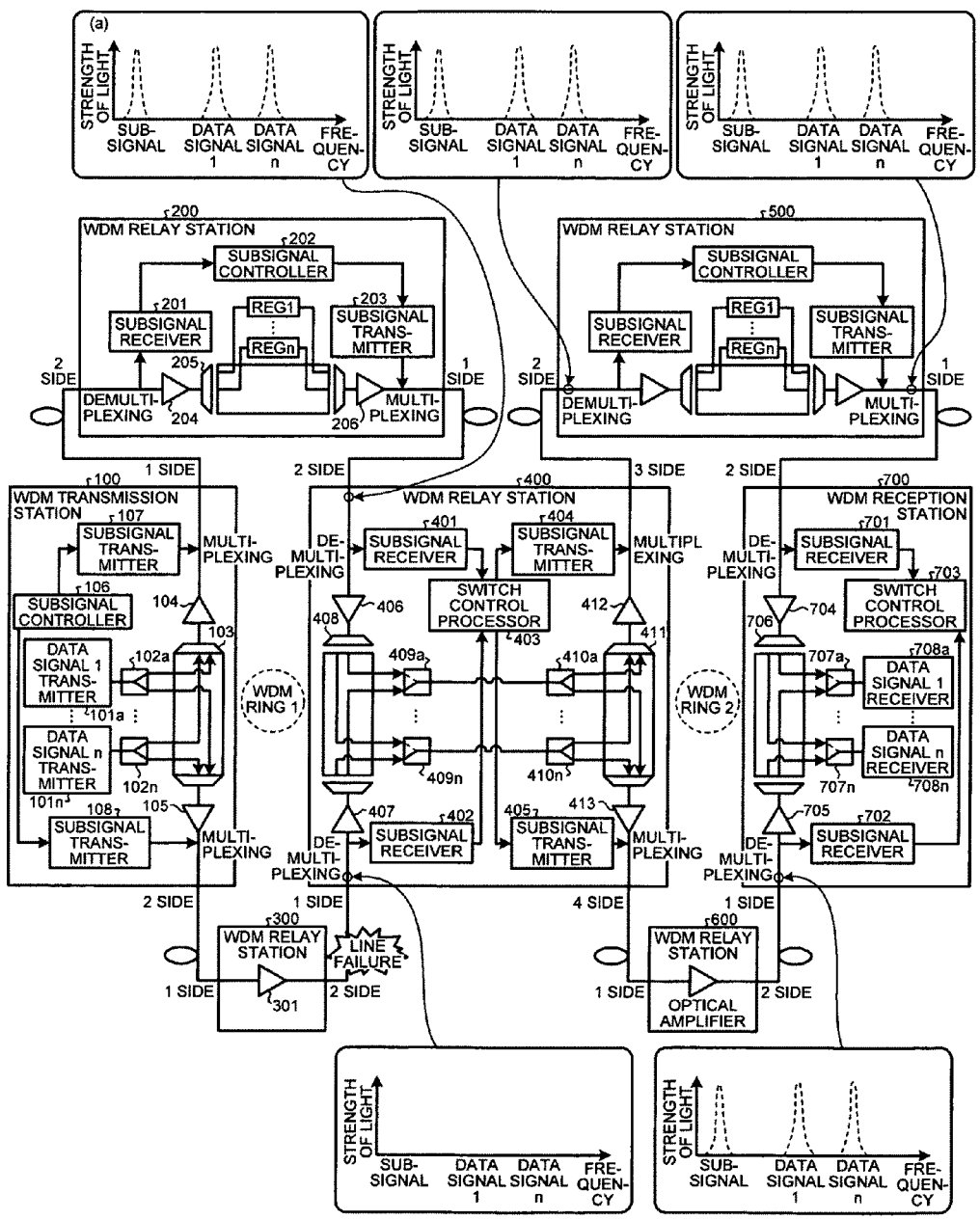
FIG. 12 is a diagram illustrating an example of the case where the failure of FIG. 11 is restored.

FIG. 11 illustrates an example of the case where the line failure is generated between the WDM relay station 300 and the WDM relay station 400 in the optical network according to the second embodiment. FIG. 12 illustrates an example of the case where the failure of FIG. 11 is restored. As illustrated in FIG. 11, the optical switches 409a to 409n of the WDM relay station 400 are connected to the side of the WDM relay station 300. The optical switches 707a to 707n of the WDM reception station 700 are connected to the side of the WDM relay station 600. The switch control code of the subsignal that is transmitted from the WDM transmission station 100 is a default value "WCS flag=ON, switching permission flag=ON, and failure detection flag=OFF".

In this state, the case where the line failure is generated between the WDM relay station 300 and the WDM relay station 400 in the optical network will be described. In this case, since the optical switches 409a to 409n are connected to the side of the WDM relay station 300, the WDM relay station 400 may not receive the data signal and the subsignal, as illustrated in (a) of FIG. 11. Since the WDM relay station 400 can internally generate the subsignal in the self device and transmit the subsignal, the WDM relay station 400 generates a subsignal where the "switching permission flag" is set to "OFF" and transmits the subsignal to the device of the downstream side.

As a result, the WDM relay station 600 can receive only the subsignal. As illustrated in (b) of FIG. 11, the WDM relay station 600 can transmit only the subsignal of "switching permission flag=OFF" to the WDM reception station 700. As illustrated in (c) of FIG. 11, the WDM relay station 500 can receive only the subsignal. Since the WDM relay station 500 is a regenerative relay station, as illustrated in (d) of FIG. 11, the WDM relay station 500 generates a data signal where a payload is empty and transmits a WDM signal where the generated data signal and the subsignal of "switching permission flag=OFF" are multiplexed to the WDM reception station 700.

At this time, that is, at the time of generation of the failure, the optical switches 707a to 707n of the WDM reception station 700 are connected to the side of the WDM relay station 600. For this reason, as illustrated in (b) of FIG. 11, only the subsignal of "switching permission flag=OFF" can be received. Therefore, the switch control processor 703 of the WDM reception station 700 controls the optical switches 707a to 707n not to be switched.

Meanwhile, as illustrated in (a) of FIG. 11, since each of the optical switches 409a to 409n of the WDM relay station 400 may not receive the data signal and the subsignal, the switching determination processing is executed. In this case, a normal WDM signal where the data signal and the subsignal (switch control code=default value) are multiplexed is transmitted from the WDM relay station 200 to the WDM relay station 400 (refer to (e) of FIG. 11). Therefore, the switch control processor 403 of the WDM relay station 400 determines that the failure is not generated in the device of the switching destination, the "default detection flag" of the subsignal received from the device of the switching destination is "OFF", the "switching permission flag" is "ON", and switching is enabled.

As illustrated in FIG. 12, the switch control processor 403 of the WDM relay station 400 switches connection of each of the optical switches 409a to 409n from the WDM relay station 300 to the WDM relay station 200. As a result, as illustrated in (a) FIG. 12, the WDM relay station 400 can receive a normal WDM signal where the subsignal to which the default value is set and the data signal are multiplexed, from the WDM relay station 200.

Then, the WDM relay station 400 restores the failure and transmits a WDM signal where the subsignal to which the default value is set and the data signal are multiplexed to the WDM relay station 500 or the WDM relay station 600. As a result, the WDM reception station 700 can receive the WDM signal where the subsignal to which the default value is set and the data signal are multiplexed. Therefore, the WDM reception station 700 does not execute switching of the optical switch without depending on whether the failure is generated and can receive the normal WDM signal from the WDM relay station 600.

Second Failure Example

Figure 13:
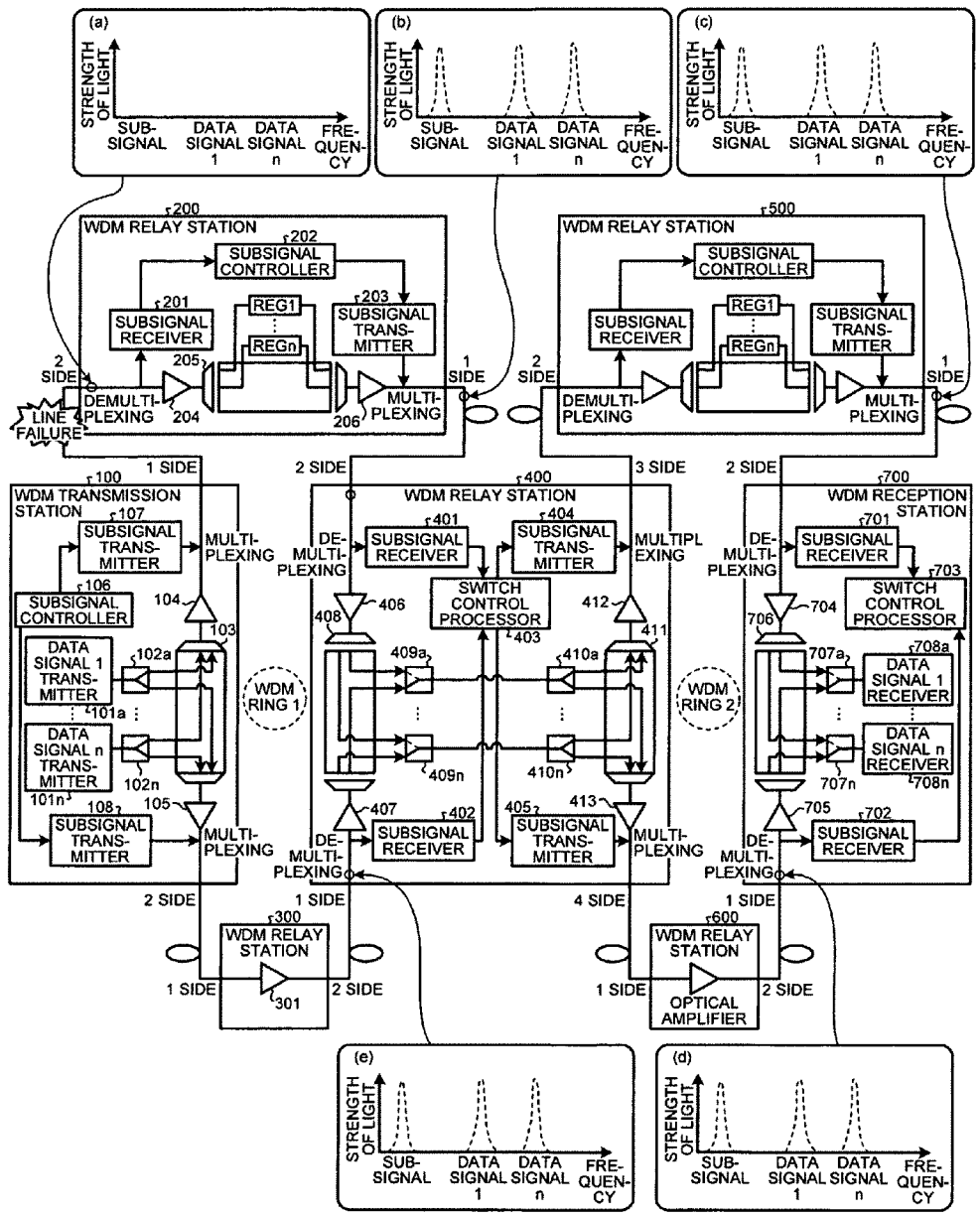
FIG. 13 is a diagram illustrating an example of the case where a line failure is generated between a WDM transmission station 100 and a WDM relay station 200 in the optical network according to the second embodiment.
Figure 14:
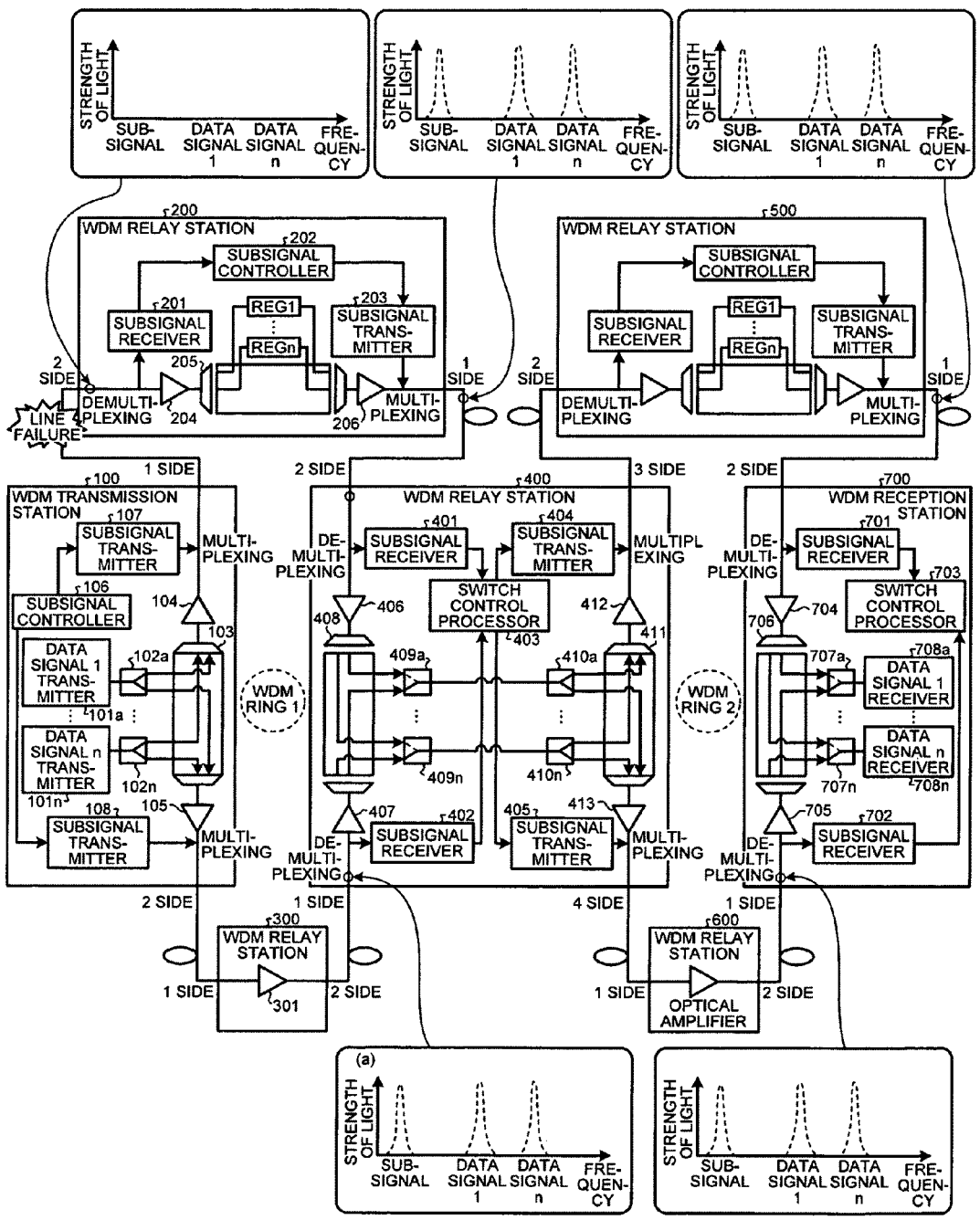
FIG. 14 is a diagram illustrating an example of the case where the failure of FIG. 13 is restored.

FIG. 13 illustrates an example of the case where a line failure is generated between the WDM transmission station 100 and the WDM relay station 200 in the optical network according to the second embodiment. FIG. 14 illustrates an example of the case where the failure of FIG. 13 is restored. As illustrated in FIG. 13, different from the first failure example, the optical switches 409a to 409n of the WDM relay stations 400 are connected to the side of the WDM relay station 200. The optical switches 707a to 707n of the WDM reception station 700 are connected to the side of the WDM relay station 600, similar to the first failure example. The switch control code of the subsignal that is transmitted from the WDM transmission station 100 is a default value "WCS flag=ON, switching permission flag=ON, and failure detection flag=OFF".

In this state, the case where the line failure is generated between the WDM transmission station 100 and the WDM relay station 200 in the optical network will be described. In this case, as illustrated in (a) of FIG. 13, the WDM relay station 200 may not receive the data signal and the subsignal. Meanwhile, since the WDM relay station 200 is a regenerative relay station that has the REG1 to REGn, the WDM relay station 200 generates a data signal where a payload is empty. As illustrated in (b) of FIG. 13, the WDM relay station 200 multiplexes the subsignal with the data signal and transmits a multiplexed signal to the WDM relay station 400. At this time, the WDM relay station 200 multiplexes a subsignal where "failure detection flag=ON" and "switching permission flag=ON" are set.

Next, since the subsignal of "failure detection flag=ON" is included in the WDM signal received from the WDM relay station 200, the switch control processor 403 of the WDM relay station 400 executes control to suppress switching with respect to the device of the downstream side. That is, the switch control processor 403 transmits a WDM signal where the subsignal of "switching permission flag=OFF" is multiplexed with the data signal which is received from the WDM relay station 200 and in which a payload is empty, to the WDM relay station 500 and the WDM relay station 600.

Similar to the WDM relay station 200, the WDM relay station 500 generates a data signal where a payload is empty, multiplexes the same subsignal as the subsignal received from the WDM relay station 400 with the data signal, and transmits a multiplexed signal to the WDM reception station 700 (refer to (c) of FIG. 13). The WDM relay station 600 amplifies the WDM signal that is received from the WDM relay station 400 and transmits the amplified signal to the WDM reception station 700 (refer to (d) of FIG. 13).

As such, the WDM signal where the data signal of which the payload is empty and the subsignal are multiplexed is transmitted, and the switch control processor 403 of the WDM relay station 400 detects "failure detection flag=ON" and "switching permission flag=ON" from the subsignal that is received from the WDM relay station 200. The switch control processor 403 determines that the switching is to be immediately executed, from "failure detection flag=ON". As illustrated in (e) of FIG. 13, the switch control processor 403 detects that a normal WDM signal can be received from the WDM relay station 300 becoming the switching destination. As a result, the switch control processor 403 switches connection of the optical switches 409a to 409n from the WDM relay station 200 to the WDM relay station 300.

In this way, if the switching of the optical switches is executed, as illustrated in (a) of FIG. 14, the WDM relay station 400 can receive the WDM signal where the subsignal to which the default value is set and the data signal are multiplexed. Then, the WDM relay station 400 restores the failure and transmits the WDM signal where the subsignal to which the default value is set and the data signal are multiplexed to the WDM relay station 500 or the WDM relay station 600. As a result, the WDM reception station 700 can receive the WDM signal where the subsignal to which the default value is set and the data signal are multiplexed. Therefore, the WDM reception station 700 does not execute switching of the optical switch without depending on whether the failure is generated and can receive a normal WDM signal from the WDM relay station 600.

Effect According to the Second Embodiment

As described above, the optical network using the WDM uses the subsignal to which the switch control code is added for each of the channels. As a result, the unnecessary switching of the optical switches based on the failure detection can be prevented and the failure restoration time can be decreased. The fluttering of the optical switches at the time of the multi-step optical switch configuration can be prevented, and an optical network that can immediately restore the failure based on the optical switches can be realized.

In the related art, when the data signal (where payload is empty) can be received without depending on whether the failure is generated, the failure may not be detected. For this reason, the failure may not be quickly restored. Meanwhile, in the present application, since the failure can be detected using the "failure detection flag" added to the subsignal, the failure can be quickly detected, the switching of the optical switches can be executed, and the failure can be restored even in the second failure example. Since the switching of the optical switch of the downstream side can be suppressed using the "switching permission flag" added to the subsignal, the failure can be quickly restored and the fluttering of the optical switch that may be generated when the optical switch is affected by the generated failure can be prevented.

[c] Third Embodiment

The embodiments of the present invention have been described. However, the present invention may be realized by a variety of different embodiments, in addition to the above-described embodiments. Hereinafter, the different embodiments will be described.

Format of the Subsignal

For example, in the second embodiment, the OTN frame is used in the subsignal, but the present application is not limited thereto. For example, a frame such as Ethernet (registered trademark) or SONET may be used and an independently defined format may be used.

Maintenance Command

Figure 15:
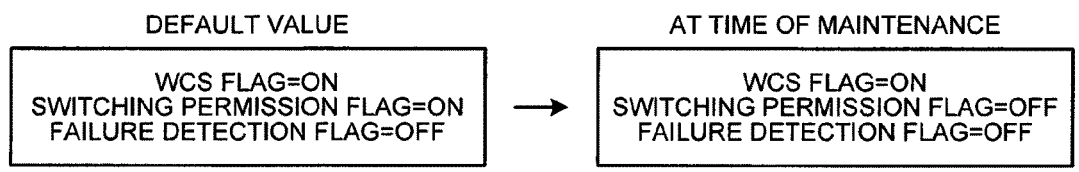
FIG. 15 is a diagram illustrating a switch control code of a subsignal at the time of maintenance.

For example, when the maintenance is executed in the optical network using the WDM described in the second embodiment, the maintenance is executed in each station. For this reason, switching may be generated in the optical switch connected to the station during the maintenance. In the present application, as illustrated in FIG. 15, the subsignal controller 106 of the WDM transmission station transmits a subsignal where the "switching permission flag" in the default value "WCS flag=ON, switching permission flag=ON, and failure detection flag=OFF" is set to "OFF". In this way, in each station that receives the WDM signal where the subsignal of "WCS flag=ON, switching permission flag=ON, and failure detection flag=OFF" is multiplexed, since "switching permission flag=OFF" is set, the switching of the optical switch can be suppressed. Therefore, even at the time of the maintenance, the fluttering of the optical switch can be suppressed. FIG. 15 illustrates a switch control code of the subsignal at the time of the maintenance.

Configuration of the Optical Switch and the Relay Station

Figure 16:
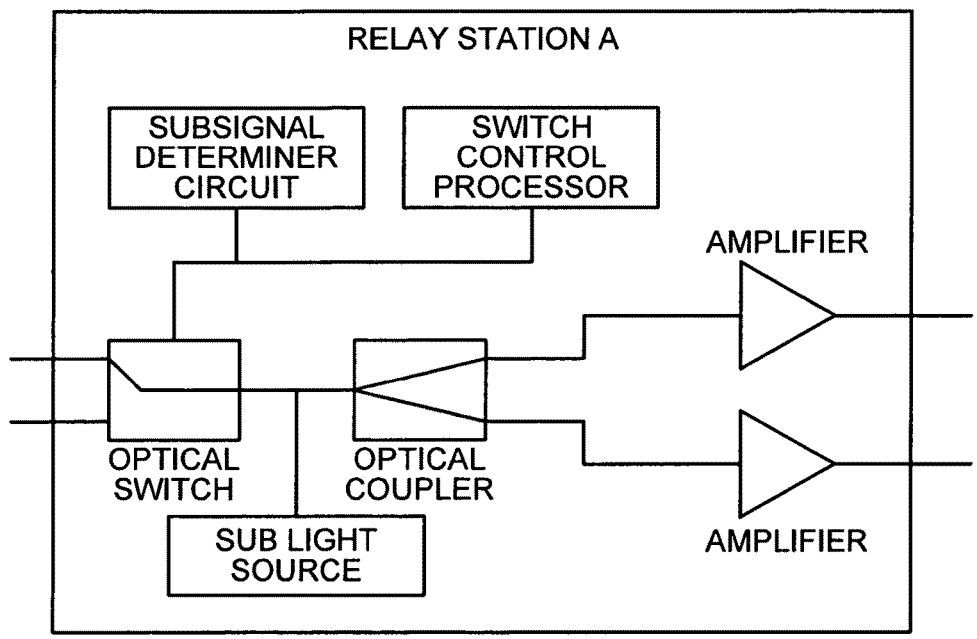
FIG. 16 is a diagram illustrating an example of a relay station that determines switching of an optical switch.
Figure 17:
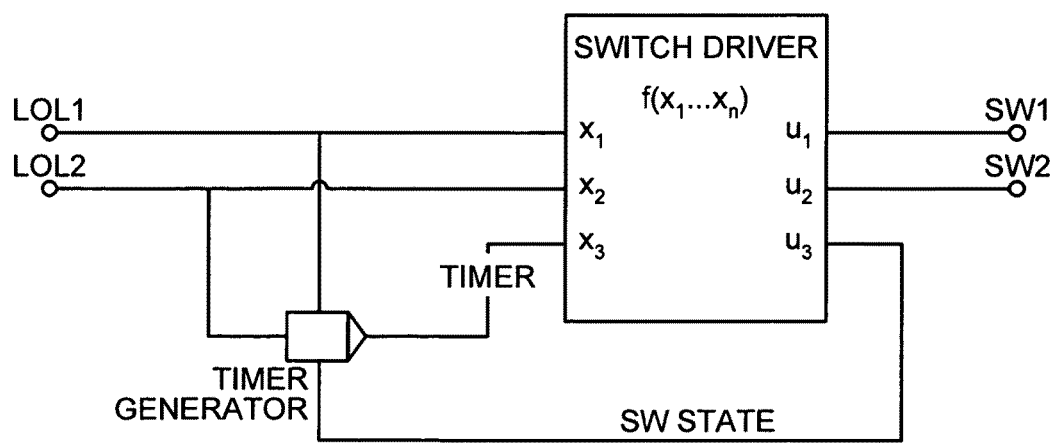
FIG. 17 is a diagram illustrating an example of an optical switch that has a timer function.
Figure 18:
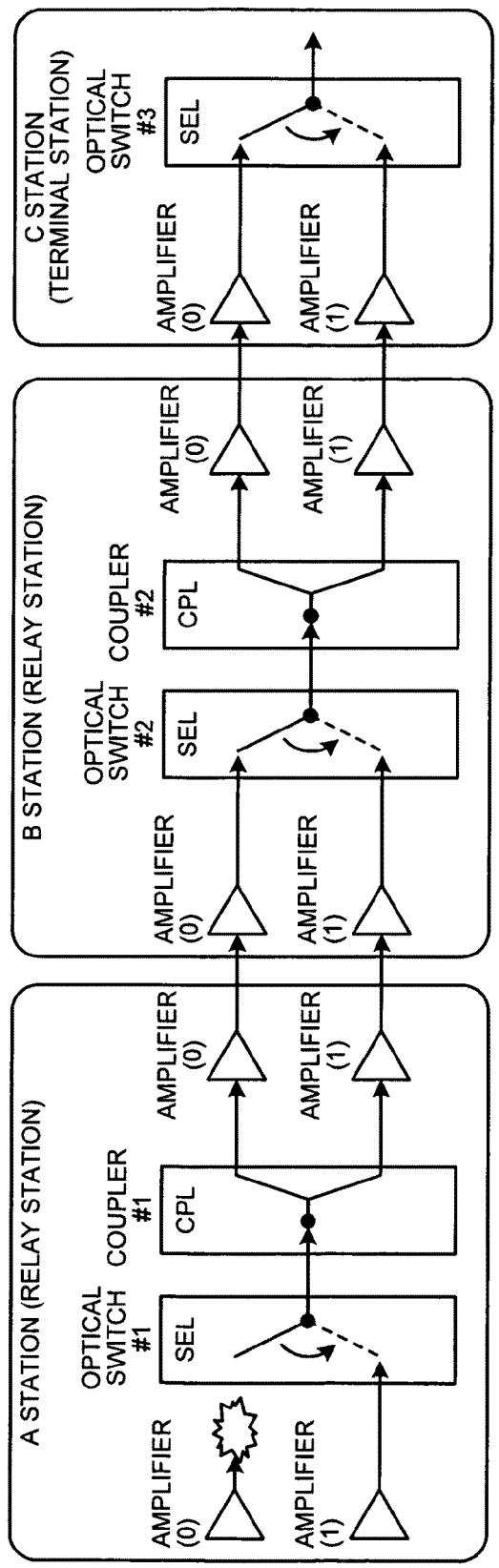
FIG. 18 is a diagram illustrating a first example of a network where optical switches having a timer function are configured in multi-steps.
Figure 19:
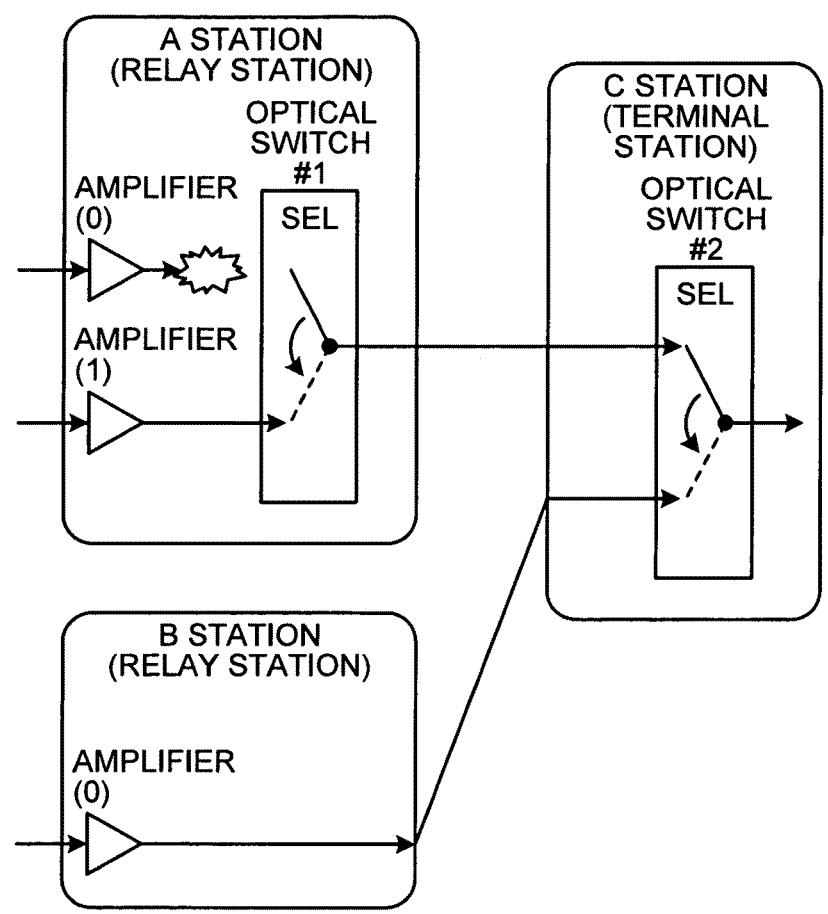
FIG. 19 is a diagram illustrating a second example of the network where the optical switches having the timer function are configured in multi-steps.

In the first embodiment, the optical switch executes the switching determination, but the present application is not limited thereto. For example, as illustrated in FIG. 16, a subsignal determiner circuit and a switch control processor may be provided in the relay station A described in the first embodiment to be connected to the optical switch. Even in this configuration, the same processing as that of the first embodiment can be executed. In the second embodiment, the switch control processor of each station executes the switching determination of the optical switch, but the present application is not limited thereto. For example, the switch control processor may be provided in each optical switch. FIG. 16 illustrates an example of a relay station that executes the switching determination of the optical switch.

Switch Control Code

In the second embodiment, the switch control code is used. However, even when the switch control code is applied to the first embodiment, the same processing can be executed, the unnecessary switching of the optical switch based on the failure detection can be prevented, and the failure restoration time can be decreased. The method that uses only the subsignal as described in the first embodiment may be applied to the second embodiment.

System

All or part of the processes that are described as being automatically executed among the processes described in the embodiments may be manually executed. Alternatively, all or part of the processes that are described as being manually executed may be automatically executed using a known method. In addition, the processing sequences, the control sequences, and the specific names that are illustrated in the specification and the drawings, for example, the information including the variety of data or parameters illustrated in FIG. 2 may be arbitrarily changed, except for the case where special mentions are given.

The components of the individual devices that are illustrated in the drawings are functional and conceptual, and are not physically configured as illustrated in the drawings in some cases. That is, the specific forms of separation and/or integration of the devices such as integration of the subsignal determiner circuit and the switch control processor are not limited to the forms illustrated in the drawings. All or part of the devices may be configured to be functionally or physically separated and/or integrated in an arbitrary unit according to the various loads or use situations. All or part of the processing functions that are executed in the individual devices may be realized by a CPU and a program analyzed and executed by the CPU.

Program

The optical switch control method that is described in the embodiments may be realized by executing a prepared program by a computer such as a personal computer or a workstation. This program may be distributed through a network such as the Internet. This program may be recorded in a computer readable recording medium such as a hard disk, a flexible disk (FD), a CD-ROM, an MO, and a DVD and may be executed by reading the program from the recording medium by the computer.

According to one aspect of the light transmission device, the optical relay device, the optical wavelength multiplexing transmission apparatus, the optical switch, and the light transmission method, unnecessary switching of the optical switches based on failure detection can be prevented and a failure restoration time can be decreased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A light transmission device, comprising:
    an optical switch that switches a reception path of an optical signal where a data signal corresponding to a signal to be transmitted and a subsignal having the wavelength different from the wavelength of the data signal are multiplexed;
    a subsignal determiner circuit that determines whether the subsignal is included in a received optical signal, when the data signal is not included in the received optical signal;
    a switch control processor that maintains a connection path of the optical switch without switching the connection path, when it is determined by the subsignal determiner circuit that the subsignal is included;
    an information storage unit that stores switching permission information and failure detection information in association with a combination of an input power level of the data signal and an input power level of the subsignal, the switching permission information indicating whether or not to permit switching of the optical switch of a downstream node irrespective of the existence of failure detection, the failure detection information urging, when the failure is detected, the switching of the optical switch of the downstream node;
    a subsignal generator circuit that specifies the switching permission information and the failure detection information based on the combination of the input power level of the data signal and the input power level of the subsignal which are included in the optical signal received from an upstream node, and generates the subsignal including the specified switching permission information and the specified failure detection information; and
    a signal transmitter that transmits the optical signal where the subsignal generated by the subsignal generator circuit and the data signal are multiplexed to the downstream node.

2. The light transmission device according to claim 1, further comprising:
    a switch control content storage unit that stores switch control contents, which are specified by the failure detection information and the switching permission information added to the subsignal included in the optical signal received from the upstream node and are executed by the switch control processor,
    wherein the switch control processor specifies switch control contents corresponding to the failure detection information and the switching permission information added to the subsignal included in the optical signal received by the optical switch, from the switch control content storage unit, and executes the specified switch control contents.

3. The light transmission device according to claim 1, wherein, the subsignal generator circuit generates a subsignal where a suppressing instruction to suppress switching of the optical switch is added, when the maintenance is executed in the light transmission device or the maintenance is executed in an optical network including the light transmission device, and
    the signal transmitter transmits an optical signal where the subsignal generated by the subsignal generator circuit and the data signal are multiplexed to the downstream node.

4. An optical relay device, comprising:
    an information storage unit that stores switching permission information and failure detection information in association with a combination of an input power level of a data signal corresponding to a signal to be transmitted and an input power level of a subsignal having the wavelength different from the wavelength of the data signal, the switching permission information indicating whether or not to permit switching of an optical switch of a downstream node irrespective of the existence of failure detection, the failure detection information urging, when the failure is detected, the switching of the optical switch of the downstream node;
    a subsignal generator circuit that specifies the switching permission information and the failure detection information based on the combination of the input power level of the data signal and the input power level of the subsignal which are included in the optical signal received from an upstream node, and generates the subsignal including the specified switching permission information and the specified failure detection information; and
    a signal transmitter that transmits the optical signal where the subsignal generated by the subsignal generator circuit and the data signal are multiplexed to the downstream node.

5. An optical wavelength multiplexing transmission apparatus, comprising:
    a demultiplexer that receives an optical signal where each of a plurality of data signal corresponding to a signal to be transmitted and a subsignal having the wavelength different from the wavelength of the each of a plurality of data signal are multiplexed, and demultiplexes the plurality of data signals and the subsignal from the optical signal;
    a plurality of optical switches that switch reception paths of the plurality of data signals, respectively;

a switch control processor that maintains a connection path of the optical switch without switching the connection path, when the subsignal is demultiplexed from the optical signal by the demultiplexer;

an information storage unit that stores switching permission information and failure detection information in association with a combination of an input power level of the data signal and an input power level of the subsignal, the switching permission information indicating whether or not to permit switching of the plurality of optical switches of a downstream node irrespective of the existence of failure detection, the failure detection information urging, when the failure is detected, the switching of the plurality of optical switches of a downstream node;

a subsignal generator circuit that specifies the switching permission information and the failure detection information based on the combination of the input power level of the data signal and the input power level of the subsignal which are included in the optical signal received from an upstream node, and generates the subsignal including the specified switching permission information and the specified failure detection information; and a signal transmitter that transmits the optical signal where the subsignal generated by the subsignal generator circuit and the plurality of data signal are multiplexed to the downstream node.

6. The optical wavelength multiplexing transmission apparatus according to claim 5, further comprising:

a switch control content storage unit that stores switch control contents, which are specified by failure detection information and/or switching permission information added to a subsignal included in an optical signal received from the upstream node and are executed by the switch control processor, wherein the switch control processor specifies switch control contents corresponding to failure detection information and/or switching permission information added to a subsignal included in an optical signal received by each of the plurality of optical switches, from the switch control content storage unit, and executes the specified switch control contents.

7. A light transmission method comprising:

determining whether the subsignal having the wavelength different from the wavelength of a data signal corresponding to a signal to be transmitted is included in a received optical signal, when the data signal is not included in the received optical signal; and maintaining a reception path of the optical signals without switching the reception path, when it is determined that the subsignal is included;

referring to switching permission information and failure detection information in association with a combination of an input power level of the data signal and an input power level of the subsignal, the switching permission information indicating whether or not to permit switching of the optical switch of a downstream node irrespective of the existence of failure detection, the failure detection information urging, when the failure is detected, the switching of the optical switch of the downstream node;

specifying the switching permission information and the failure detection information based on the combination of the input power level of the data signal and the input power level of the subsignal which are included in the optical signal received from an upstream node;

generating the subsignal including the specified switching permission information and the specified failure detection information; and transmitting the optical signal where the subsignal generated at the generating and the data signal are multiplexed to the downstream node.

8. An optical wavelength multiplexing transmission method comprising:

receiving an optical signal where each of a plurality of data signal corresponding to a signal to be transmitted and a subsignal having the wavelength different from the wavelength of the each of a plurality of data signal are multiplexed;

demultiplexing the plurality of data signals and the subsignal from the optical signal;

maintaining a reception path of each of the plurality of data signals without switching the reception path, when the subsignal is demultiplexed from the optical signal;

referring to switching permission information and failure detection information in association with a combination of an input power level of the data signal and an input power level of the subsignal, the switching permission information indicating whether or not to permit switching of the plurality of optical switches of a downstream node irrespective of the existence of failure detection, the failure detection information urging, when the failure is detected, the switching of the plurality of optical switches of a downstream node;

specifying the switching permission information and the failure detection information based on the combination of the input power level of the data signal and the input power level of the subsignal which are included in the optical signal received from an upstream node;

generating the subsignal including the specified switching permission information and the specified failure detection information; and transmitting the optical signal where the subsignal generated by the subsignal generator circuit and the plurality of data signal are multiplexed to the downstream node.

* * * * *